US009544108B2

(12) United States Patent
Geirhofer et al.

(10) Patent No.: US 9,544,108 B2
(45) Date of Patent: *Jan. 10, 2017

(54) METHOD AND APPARATUS FOR ENABLING CHANNEL AND INTERFERENCE ESTIMATIONS IN MACRO/RRH SYSTEM

(75) Inventors: Stefan Geirhofer, San Diego, CA (US); Tingfang Ji, San Diego, CA (US); Peter Gaal, San Diego, CA (US); Tao Luo, San Diego, CA (US); Wanshi Chen, San Diego, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,599

(22) Filed: Dec. 23, 2011

(65) Prior Publication Data

US 2012/0207043 A1   Aug. 16, 2012

Related U.S. Application Data

(60) Provisional application No. 61/442,087, filed on Feb. 11, 2011.

(51) Int. Cl.
*H04W 24/10* (2009.01)
*H04L 5/00* (2006.01)
*H04L 25/02* (2006.01)

(52) U.S. Cl.
CPC ............ *H04L 5/0048* (2013.01); *H04L 5/006* (2013.01); *H04L 25/0226* (2013.01); *H04L 5/0023* (2013.01); *H04L 5/0057* (2013.01)

(58) Field of Classification Search
CPC .... H04L 5/0048; H04L 5/006; H04L 25/0226; H04L 5/0057; H04L 5/0023
(Continued)

(56) References Cited

U.S. PATENT DOCUMENTS 6,549,787 B1   4/2003 Ravi
8,208,434 B2 *  6/2012 Sayana et al. ................ 370/329
(Continued)

FOREIGN PATENT DOCUMENTS

CN   101777941 A   7/2010
CN   101841357 A   9/2010
(Continued)

OTHER PUBLICATIONS

Catt: "Design of reference signals for relay backhaul link in LTE-A", R1-094152, 3rd Generation Partnership Project (3GPP), Mobile Competence Centre; 650, Route Des Lucioles; F-06921 Sophia-Antipolis Cedex; France, No. Miyazaki, Oct. 12, 2009, XP050388622, [retrieved on Oct. 6, 2009].

(Continued)

*Primary Examiner* — Chandrahas Patel
*Assistant Examiner* — Lan Huong Truong
(74) *Attorney, Agent, or Firm* — Arent Fox LLP

(57) ABSTRACT

Aspects disclosed herein relate to channel and interference estimations in a multiple transmission point environment including an eNB and RRHs. In the disclosed aspects, one or more transmission points can signal to a UE to measure channel state conditions based on a first and a second resource pattern. The UE may receive the signaling and perform interference estimation based at least in part on the first resource pattern, and channel estimation based at least in part on the second resource pattern. The UE may generate a channel state report based on the interference and channel estimations, and transmit the channel state report to a transmission point. The eNB may employ the received channel state report in scheduling one or more resources for use by the UE, and may select or adjust network traffic on the first and the second resource pattern, to affect the resulting channel and interference estimation.

46 Claims, 17 Drawing Sheets

(58) Field of Classification Search
USPC .................. 370/322, 332, 443, 508, 352
See application file for complete search history.

(56) References Cited

U.S. PATENT DOCUMENTS

| | | | |
|---|---|---|---|
| 8,576,792 B2 | 11/2013 | Kim et al. | |
| 8,599,711 B2* | 12/2013 | Hugl et al. ............... | 370/252 |
| 8,634,363 B2* | 1/2014 | Kim ............... | H04L 5/0023 370/329 |
| 8,712,399 B2* | 4/2014 | Chen et al. ............ | 455/422.1 |
| 2005/0272472 A1 | 12/2005 | Goldberg et al. | |
| 2006/0276227 A1 | 12/2006 | Dravida | |
| 2007/0167181 A1 | 7/2007 | Ramesh et al. | |
| 2008/0049791 A1 | 2/2008 | Tirkkonen et al. | |
| 2008/0095036 A1 | 4/2008 | Gorokhov et al. | |
| 2008/0316950 A1 | 12/2008 | Damnjanovic | |
| 2009/0235176 A1 | 9/2009 | Jayanthi | |
| 2009/0247067 A1 | 10/2009 | Li et al. | |
| 2009/0253426 A1 | 10/2009 | Qiu et al. | |
| 2009/0296635 A1 | 12/2009 | Hui et al. | |
| 2010/0034175 A1 | 2/2010 | Xiao et al. | |
| 2010/0056215 A1 | 3/2010 | Gorokhov et al. | |
| 2010/0067592 A1 | 3/2010 | Goldhamer | |
| 2010/0067627 A1 | 3/2010 | Lincoln et al. | |
| 2010/0069122 A1 | 3/2010 | Ito | |
| 2010/0075706 A1 | 3/2010 | Montojo et al. | |
| 2010/0099428 A1* | 4/2010 | Bhushan ............. | H04J 11/0059 455/452.1 |
| 2010/0111065 A1 | 5/2010 | Noh et al. | |
| 2010/0118989 A1 | 5/2010 | Sayana et al. | |
| 2010/0177746 A1 | 7/2010 | Gorokhov et al. | |
| 2010/0195635 A1 | 8/2010 | Maeda | |
| 2010/0234037 A1 | 9/2010 | Terry et al. | |
| 2010/0238824 A1 | 9/2010 | Farajidana et al. | |
| 2010/0265874 A1 | 10/2010 | Palanki et al. | |
| 2010/0272032 A1 | 10/2010 | Sayana et al. | |
| 2010/0285810 A1 | 11/2010 | Ko et al. | |
| 2010/0290413 A1 | 11/2010 | Kuwahara | |
| 2010/0311349 A1 | 12/2010 | Koo et al. | |
| 2010/0311437 A1 | 12/2010 | Palanki et al. | |
| 2010/0317343 A1 | 12/2010 | Krishnamurthy et al. | |
| 2010/0322227 A1 | 12/2010 | Luo | |
| 2010/0323684 A1 | 12/2010 | Cai et al. | |
| 2011/0026482 A1* | 2/2011 | Li ....................... | H04L 5/0048 370/329 |
| 2011/0044250 A1 | 2/2011 | Han et al. | |
| 2011/0075624 A1 | 3/2011 | Papasakellariou et al. | |
| 2011/0085610 A1 | 4/2011 | Zhuang et al. | |
| 2011/0103324 A1 | 5/2011 | Nam et al. | |
| 2011/0122968 A1 | 5/2011 | Jongren et al. | |
| 2011/0149894 A1 | 6/2011 | Luo et al. | |
| 2011/0151886 A1 | 6/2011 | Grayson et al. | |
| 2011/0170435 A1* | 7/2011 | Kim ............... | H04L 5/0023 370/252 |
| 2011/0170496 A1 | 7/2011 | Fong et al. | |
| 2011/0176440 A1* | 7/2011 | Frank et al. ............ | 370/252 |
| 2011/0176634 A1 | 7/2011 | Yoon et al. | |
| 2011/0183669 A1 | 7/2011 | Kazmi | |
| 2011/0188481 A1 | 8/2011 | Damnjanovic et al. | |
| 2011/0194536 A1 | 8/2011 | Kim et al. | |
| 2011/0194551 A1 | 8/2011 | Lee et al. | |
| 2011/0199986 A1* | 8/2011 | Fong ............... | H04L 5/0035 370/329 |
| 2011/0244877 A1 | 10/2011 | Farajidana et al. | |
| 2011/0256833 A1* | 10/2011 | Racz ............... | H04W 24/08 455/63.1 |
| 2011/0256861 A1 | 10/2011 | Yoo et al. | |
| 2011/0261673 A1 | 10/2011 | Luo et al. | |
| 2011/0268050 A1 | 11/2011 | Farajidana et al. | |
| 2011/0268077 A1 | 11/2011 | Wan et al. | |
| 2011/0274188 A1 | 11/2011 | Sayana et al. | |
| 2011/0275394 A1 | 11/2011 | Song et al. | |
| 2011/0317637 A1 | 12/2011 | Kim et al. | |
| 2011/0317657 A1 | 12/2011 | Chmiel et al. | |
| 2011/0319025 A1 | 12/2011 | Siomina et al. | |
| 2012/0057566 A1 | 3/2012 | Ahmadi | |
| 2012/0088458 A1 | 4/2012 | Nogami et al. | |
| 2012/0100844 A1 | 4/2012 | Baldemair et al. | |
| 2012/0176939 A1 | 7/2012 | Qu et al. | |
| 2012/0201163 A1* | 8/2012 | Jongren et al. ............ | 370/252 |
| 2012/0207105 A1 | 8/2012 | Geirhofer et al. | |
| 2012/0208541 A1 | 8/2012 | Luo et al. | |
| 2012/0208547 A1 | 8/2012 | Geirhofer et al. | |
| 2012/0213108 A1 | 8/2012 | Ji et al. | |
| 2012/0213261 A1 | 8/2012 | Sayana et al. | |
| 2012/0315859 A1* | 12/2012 | Lee et al. ............ | 455/67.13 |
| 2013/0033998 A1* | 2/2013 | Seo et al. ............ | 370/252 |
| 2013/0039203 A1 | 2/2013 | Fong et al. | |
| 2013/0051240 A1 | 2/2013 | Bhattad et al. | |
| 2013/0250913 A1 | 9/2013 | Geirhofer et al. | |
| 2015/0146673 A1 | 5/2015 | Geirhofer et al. | |

FOREIGN PATENT DOCUMENTS

| | | |
|---|---|---|
| CN | 101917729 A | 12/2010 |
| CN | 101932025 A | 12/2010 |
| JP | 2010068496 A | 3/2010 |
| JP | 2011004212 A | 1/2011 |
| JP | 2012519998 A | 8/2012 |
| KR | 20070106391 A | 11/2007 |
| KR | 20100084102 A | 7/2010 |
| WO | 2010039066 A1 | 4/2010 |
| WO | 2010100077 A1 | 9/2010 |
| WO | 2010106819 A1 | 9/2010 |
| WO | WO2010106549 A2 | 9/2010 |
| WO | 2010122818 A1 | 10/2010 |
| WO | 2010126711 A1 | 11/2010 |
| WO | 2010150898 A1 | 12/2010 |
| WO | WO2011009486 A1 | 1/2011 |
| WO | WO2011020062 A2 | 2/2011 |
| WO | WO2011057037 A2 | 5/2011 |
| WO | WO2011100672 A1 | 8/2011 |
| WO | 2012059139 A1 | 5/2012 |
| WO | 2012116022 A1 | 8/2012 |
| WO | 2013007207 A1 | 1/2013 |

OTHER PUBLICATIONS

Discussion on RS Design for Higher-order MIMO in LTE-A Document for Discussions, 3GPP Draft; R1-091591 (Nortel-RS Design for MIMO in LTE-A), 3rd Generation Partnership Project (3GPP), Mobile Competence Centre ; 650, Route Des Lucioles ; F-06921 Sophia-Antipolis Cedex ; France, No. Seoul , Korea; Mar. 28, 2009, Mar. 28, 2009 (Mar. 28, 2009), XP050339139, [retrieved on Mar. 28, 2009].

Huawei et al., "CoMP clarification of definitions and TP", R1-083906, 3rd Generation Partnership Project (3GPP), Mobile Competence Centre; 650, Route Des Lucioles; F-06921 Sophia-Antipolis Cedex; France, No. Prague, Czech Republic, Oct. 6, 2008, XP050317217, [retrieved on Oct. 6, 2008].

Intel Corporation (UK) : "Proposal on CoMP evaluation methodology", R1-110250, 3rd Generation Partnership Project (3GPP), Mobile Competence Centre; 650, Route Des Lucioles; F-06921 Sophia-Antipolis Cedex; France, vol. RAN WG1, No. Dublin, Ireland, Jan. 11, 2011, XP050490154, [retrieved on Jan. 11, 2011].

LG, "LTE Advanced", Nov. 4, 2010, 181 pages.

Motorola Solutions: "Proposals for consideration for CoMP enhancements", 3GPP Draft; R1-110291, 3rd Generation Partnership Project (3GPP) , Mobile Competence Centre ; 650, Route Des Lucioles ; F-06921 Sophia-Antipolis Cedex ; France, vol. RAN WG1, No. Dublin, Ireland; Jan. 17, 2011, Jan. 13, 2011 (Jan. 13, 2011), XP050490370, [retrieved on Jan. 13, 2011].

Panasonic: "DM-RS for R-PDCCH and R-PDSCH", R1-094515, 3rd Generation Partnership Project (3GPP), Mobile Competence Centre; 650, Route Des Lucioles; F-06921 Sophia-Antipolis Cedex; France, Jeju, Nov. 9, 2009, XP050388935, [retrieved on Nov. 13, 2009].

Prakash Bhat et al: "LTE-advanced: an operator perspective", IEEE Communications Magazine, IEEE Service Center, Piscataway, US,

(56) References Cited

OTHER PUBLICATIONS vol. 50, No. 2, Feb. 1, 2012 (Feb. 1, 2012), pp. 104-114, XP011417046, ISSN: 0163-6804, DOI: 10.1109/MCOM.2012. 6146489 last paragraph of chapter "Features of LTE-A UL MIMO" chapter "CoMP Overview" last three paragraphs of chapter "CoMP Deployment Considerations".
Samsung: "Remaining Issues on CSI-RS Transmission", 3GPP Draft; R1-105377 Remaining Issues on CSI-RS, 3rd Generation Parnership Project (3GPP), Mobile Competence Centre ; 650, Route Des Lucioles ; F-06921 Sophia-Anti Polis Cedex ; France, vol. RAN WG1, No. Xi'an; Oct. 11, 2010, Oct 5, 2010 (Oct. 5, 2010), XP050450526, [retrieved on Oct. 5, 2010].
Motorola: "Impact of HeNB interference on paging channel performance", 3GPP Draft; R4-092399, 3rd Generation Partnership Project (3GPP), Mobile Competence Centre; 650, Route Des Lucioles; F-06921 Sophia-Antipolis Cedex; France, No. Los Angeles, CA; Jun. 25, 2009, Jun. 25, 2009 (Jun. 25, 2009), XP050353633, [retrieved on Jun. 25, 2009].
Partial International Search Report—PCT/US2011/067673—ISA/EPO—Jun. 1, 2012.
NTT Docomo: "Throughput Performance Evaluation of RE Muting for Inter-cell CSI-RS", 3GPP Draft; R1-105433 CSIRS PDSCH Muting Evaluation, 3rd Generation Partnership Project (3GPP), Mobile Competence Centre; 650, Route Des Lucioles; F-06921 Sophia-Antipolis Cedex; France, vol. RAN WG1, No. Xian, China; Oct. 11, 2010, Oct. 5, 2010 (Oct. 5, 2010), XP050450566, [retrieved on Oct. 5, 2010] p. 3, paragraph 2.
International Search Report and Written Opinion—PCT/US2011/067673—ISA/EPO—Sep. 21, 2012.
Pantech: "Considerations on signalling for PDSCH muting in LTE-Advanced", 3GPP Draft; R1-105303, 3rd Generation Partnership Project (3GPP), Mobile Competence Centre; 650, Route Des Lucioles; F-06921 Sophia-Antipolis Cedex, France; vol. RAN WG1, No. Xia an, China; Oct. 2010, Oct. 14, 2010 (Oct. 14, 2010), XP050489302, [retrieved on Oct. 14, 2010] section 2.
ZTE: "Interference coordination for control channels under non-CA based heterogeneous deployments", 3GPP Draft; R1-104566, 3rd Generation Partnership Project (3GPP), Mobile Competence Centre; 650, Route Des Lucioles; F-06921 Sophia-Antipolis Cedex; France; vol. RAN WG1, No. Madrid, Spain; Aug. 23, 2010, Aug. 17, 2010 (Aug. 17, 2010), XP050449863, [retrieved on Aug. 17, 2010] abstract; figure 4 sections 1, 4.
Alcatel-Lucent et al., "Further Details of CoMP Scenarios for Evaluation, Especially Scenario 4", 3GPP TSG RAN WG1 #64, R1-110802, Feb. 15, 2011, pp. 1-8, Retrieved from URL: http://www.3gpp.org/ftp/tsg_ran/WG1_RL1/TSGR1_64/Docs/R1-110802.zip.
Catt: "Considerations on scenarios and simulation assumptions of CoMP," R1-110059, 3GPP, Jan. 17-21, 2011, pp. 1-5.
Huawei: CoMP clarification of definitions and TP, 3GPP TSG RAN WG1 Meeting #55, R1-084351, Prague, Czech Republic, Nov. 10-Nov. 14, 2008, pp. 1-5.
Motorola Mobility, "Discussion of RRH Deployment with Single Cell ID", 3GPP TSG-RAN WG1#64 R1-110869, Taiwan, Feb. 21, 2011.
Motorola Mobility: "Overview of Coordinated Multi-Point Operation for LTE", 3GPP TSG RAN1 #63bis, R1-110301, Jan. 2011, pp. 1-3, Retrieved from URL: http://www.3gpp.org/ftp/tsg_ran/WG1_RL1/TSGR1_63b/Docs/R1-110301.zip.
Qualcomm Europe: "Impact of Downlink CoMP on the Air Interface" 3GPP Draft; R1-090366, 3rd Generation Partnership Project (3GPP), Mobile Competence Centre ; 650, Route Des Lucioles; F-06921 Sophia-Antipolis Cedex ; France, No. Ljubljana; Jan. 8, 2009, 3 Pages, XP050318270, Jan. 8, 2009 (Jan. 8, 2009).
Qualcomm Incorporated: "Signaling and Configuration of CSI-RS", 3GPP Draft; R1-104797 Signaling and Configuration of CSI-RS, 3rd Generation Partnership Project (3GPP) , Mobile Competence Centre ; 650, Route Deslucioles ; F-06921 Sophia-Antipoliscedex; France, vol. RAN WG1, No. Madrid, Spain; Aug. 23, 2010, Aug. 17, 2010 (Aug. 17, 2010), XP050449989,[retrieved on Aug. 17, 2010)sections 4 and 5.
Samsung: "Details of CQI definition for LTE-A", 3GPP Draft; R1-106034, 3rd Generation Partnership Project (3GPP), Mobile Competence Centre ; 650, Route Des Lucioles ; F-06921 Sophia-Antipolis Cedex ; France, vol. RAN WG1, No. Jacksonville, USA; Nov. 15, 2010, Nov. 9, 2010 (Nov. 9, 2010), XP050466815, [retrieved on Nov. 9, 2010] section 1 Introduction section 3 CQI definition for Rel-10 section 7.2.3 Channel quality indicator (CQI) definition.
Samsung: "DL RS Designs for LTE-Advanced," R1-091231, 3GPP, Mar. 23-27, 2009, pp. 1-5.
ZTE: "Enhanced Transmit Diversity Schemes for LTE-A Downlink," R1-091708, 3GPP, May 4-8, 2009, pp. 1-18.
ZTE: "Remaining Issues of CSI Feedback", 3GPP Draft; R1-110174, 3rd Generation Partnership Project (3GPP), Mobile Competence Centre ; 650, Route Des Lucioles ; F-06921 Sophia-Antipolis Cedex ; France, vol. RAN WG1, No. Dublin, Ireland; Jan. 17, 2010, Jan. 13, 2011, XP050490359, [retrieved on Jan. 13, 2011].
Qualcomm Europe: "Details of CSI-RS", 3GPP TSG-RAN WG1 #59, R1-094867, Nov. 9-13, 2009, Jeju, Korea, pp. 1-6.
Notice of Allowance for Korean Application No. 10-2013-7024045 dated Sep. 25, 2015, 3 pages.
Translation of First Office Action issued for Japanese Application No. 2015-075278 dated Mar. 8, 2016, 5 pages.

\* cited by examiner

METHOD AND APPARATUS FOR ENABLING CHANNEL AND INTERFERENCE ESTIMATIONS IN MACRO/RRH SYSTEM

CROSS-REFERENCE TO RELATED APPLICATION(S)

This application claims the benefit of U.S. Provisional Application Ser. No. 61/442,087, entitled "METHOD AND APPARATUS FOR ENABLING CHANNEL AND INTERFERENCE ESTIMATIONS IN MACRO/RRH SYSTEM" and filed on Feb. 11, 2011, which is expressly incorporated by reference herein in its entirety.

BACKGROUND

Field

The present disclosure relates generally to communication systems, and more particularly, to a system and method for enabling channel estimation and interference estimation in a macro evolved node B (eNB)/remote radio head (RRH) environment.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with enabling channel estimation and interference estimation in a macro eNB/RRH environment. In one example, an eNB may be equipped to signal to a UE to measure channel state conditions based on a first resource pattern and a second resource pattern. The UE may be equipped to receive the signaling and perform interference estimation based at least in part on the first resource pattern, and channel estimation based at least in part on the second resource pattern generate a channel state report based on the interference estimation and the channel estimation, and transmit the channel state report to an eNB. The eNB may schedule one or more resources for use by the UE based on the received channel state report.

According to related aspects, a method for enabling channel estimation and interference estimation in a multiple transmission point (e.g., macro eNB/RRH) environment is provided. The method can include signaling to a UE to measure channel state conditions based on a first resource pattern and a second resource pattern. Furthermore, the method may include receiving a channel state condition report from the UE based, at least in part, on measurements obtained using the first resource pattern and second resource pattern. Moreover, the method can include scheduling one or more resources for use by the UE based on the received channel state condition report.

Another aspect relates to a wireless communications apparatus. The wireless communications apparatus can include means for signaling to a UE to measure channel state conditions based on a first resource pattern and a second resource pattern. Furthermore, the wireless communications apparatus can include means for receiving a channel state condition report from the UE based, at least in part, on measurements obtained using the first resource pattern and second resource pattern. Moreover, the wireless communications apparatus can include means for scheduling one or more resources for use by the UE based on the received channel state condition report.

Another aspect relates to a wireless communications apparatus. The apparatus can include a processing system configured to signal to a UE to measure channel state conditions based on a first resource pattern and a second resource pattern. Furthermore, the processing system may be configured to receive a channel state condition report from the UE based, at least in part, on measurements obtained using the first resource pattern and second resource pattern. Moreover, the processing system may further be configured to schedule one or more resources for use by the UE based on the received channel state condition report.

Another aspect relates to a computer program product, which can have a computer-readable medium comprising code for signaling to a UE to measure channel state conditions based on a first resource pattern and a second resource pattern. Furthermore, the computer-readable medium can include code for receiving a channel state condition report from the UE based, at least in part, on measurements obtained using the first resource pattern and second resource pattern. Moreover, the computer-readable medium can include code for scheduling one or more resources for use by the UE based on the received channel state condition report.

According to related aspects, a method for enabling channel estimation and interference estimation in a multiple transmission point (e.g., macro eNB/RRH) environment is provided. The method can include receiving, by a UE, signaling of a first resource pattern and a second resource pattern. Further, the method can include performing channel estimation based at least in part on the first resource pattern, and interference estimation based at least in part on the second resource pattern. Furthermore, the method can includes generating a channel state condition report based on the interference estimation and the channel estimation. Moreover, the method can include transmitting the channel state condition report to one or more transmission points.

Another aspect relates to a wireless communications apparatus. The wireless communications apparatus can include means for receiving, by a UE, signaling of a first resource pattern and a second resource pattern. Further, the wireless communications apparatus can include means for performing channel estimation based at least in part on the first resource pattern, and interference estimation based at least in part on the second resource pattern. Furthermore, the wireless commutations device can include means for generating a channel state condition report based on the interference estimation and the channel estimation. Moreover, the wireless communications apparatus can include means for transmitting the channel state condition report to one or more transmission points.

Another aspect relates to a wireless communications apparatus. The apparatus can include a processing system configured to receive signaling of a first resource pattern and a second resource pattern. Further, the processing system may be configured to perform channel estimation based at least in part on the first resource pattern, and interference estimation based at least in part on the second resource pattern. Furthermore, the processing system may be configured to generate a channel state condition report based on the interference estimation and the channel estimation. Moreover, the processing system may further be configured to transmit the channel state condition report to one or more transmission points.

Another aspect relates to a computer program product, which can have a computer-readable medium including code for receiving signaling of a first resource pattern and a second resource pattern. Further, the computer-readable medium can include code for performing interference estimation based at least in part on the first resource pattern, and channel estimation based at least in part on the second resource pattern. Furthermore, the computer-readable medium can include code for generating a channel state report based on the interference estimation and the channel estimation. Moreover, the computer-readable medium can include code for transmitting the channel state report to one or more transmission points.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
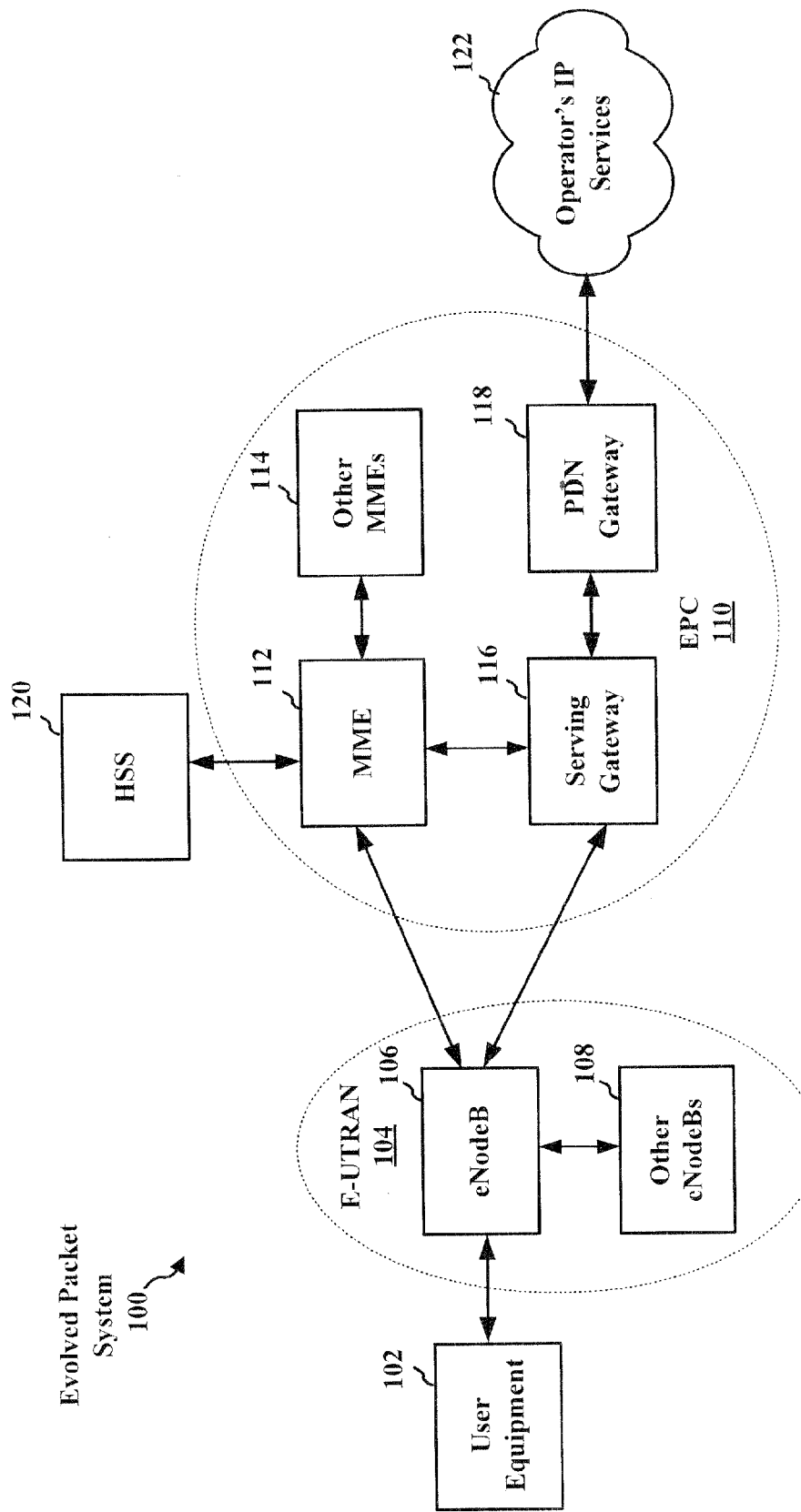
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
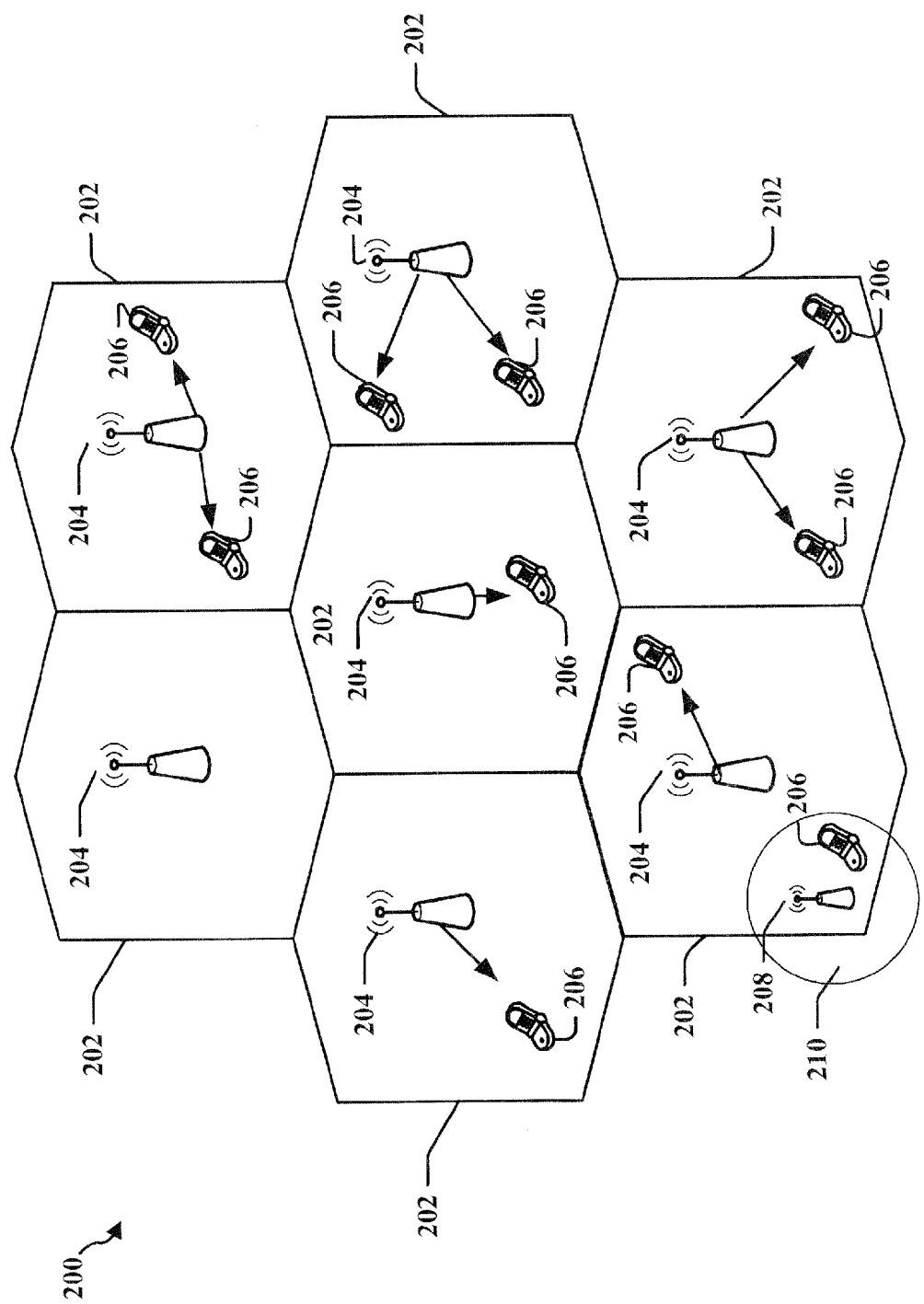
FIG. 2 is a diagram illustrating an example of an access network.

FIG. 2 is a diagram illustrating an example of an access network 200 in an LIE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
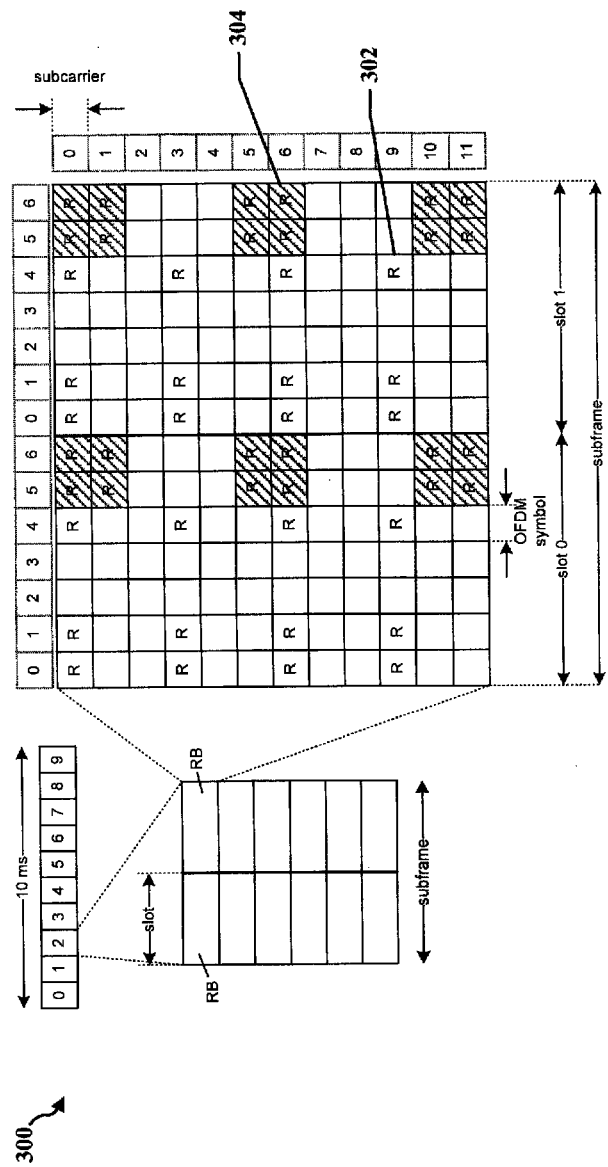
FIG. 3 is a diagram illustrating an example of a frame structure for use in an access network.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
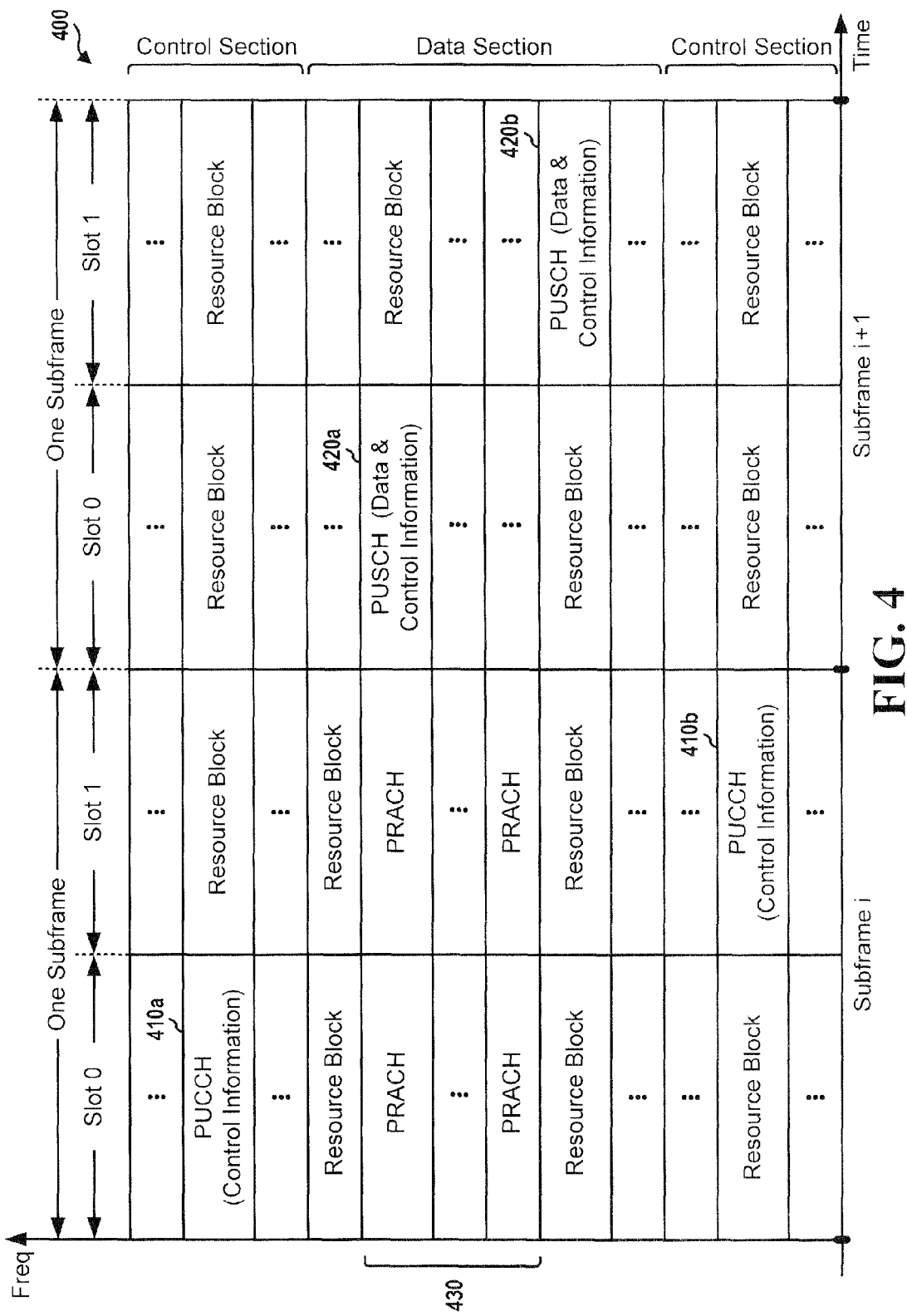
FIG. 4 shows an exemplary format for the UL in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
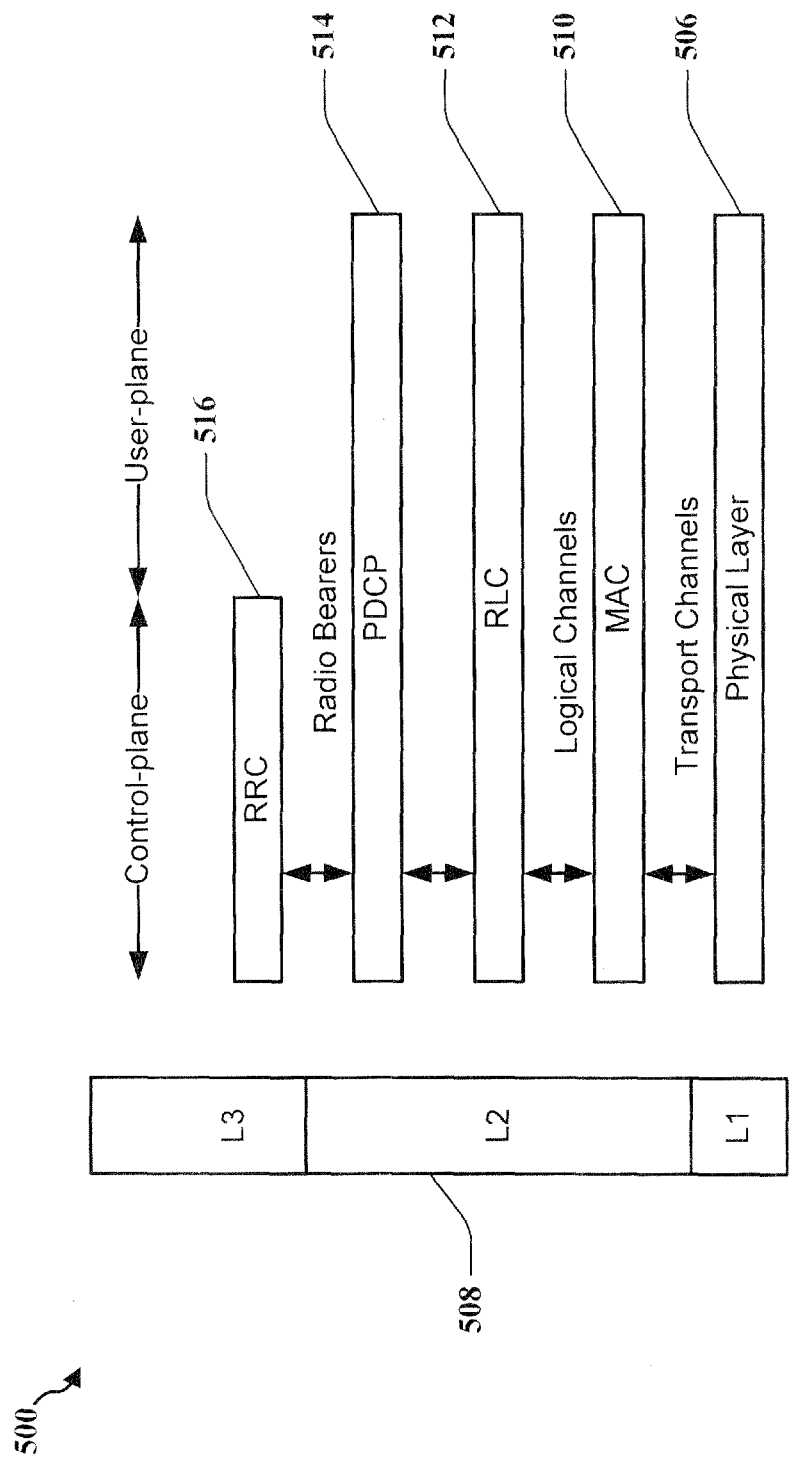
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC)

sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
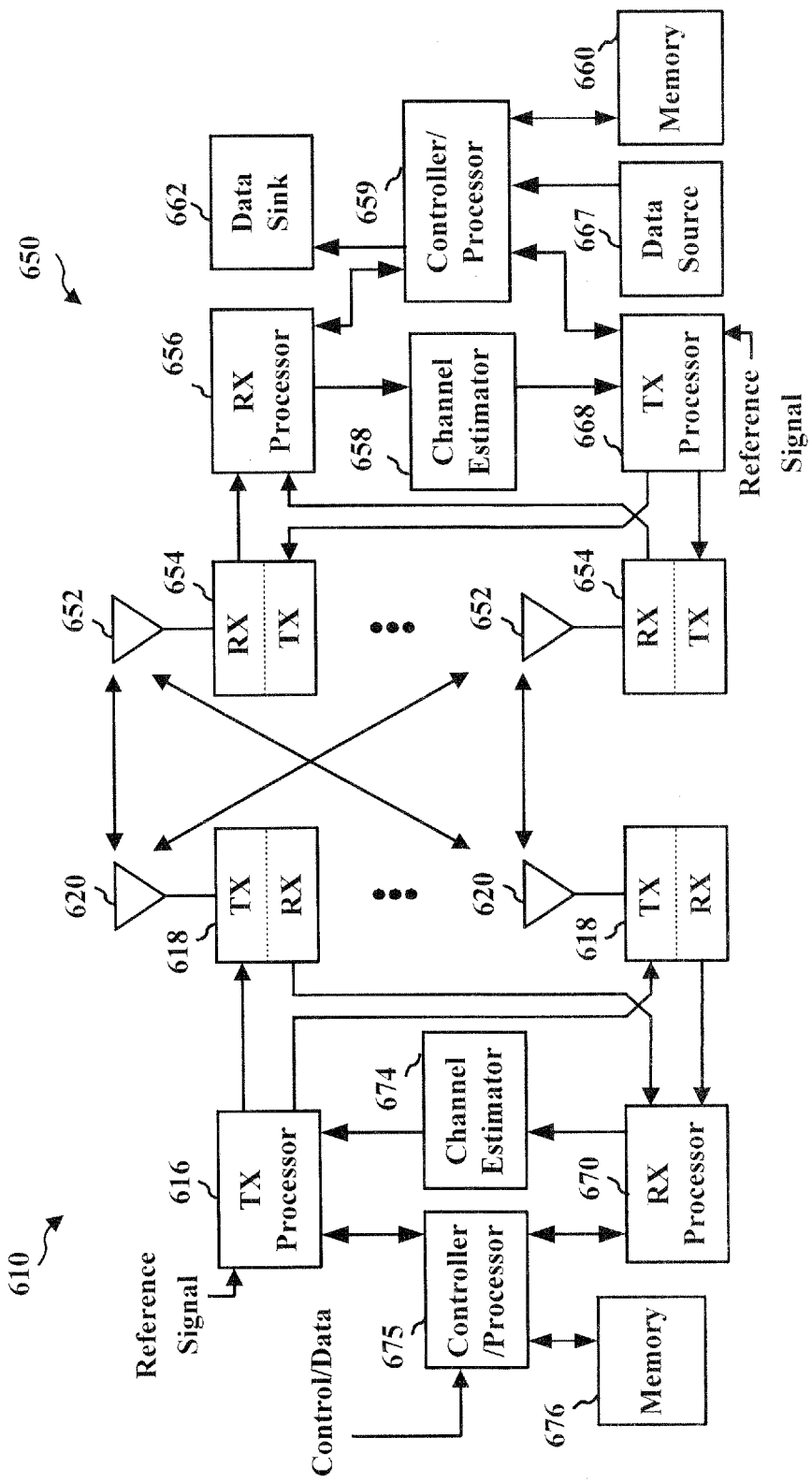
FIG. 6 is a diagram illustrating an example of an evolved Node 13 and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain. OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
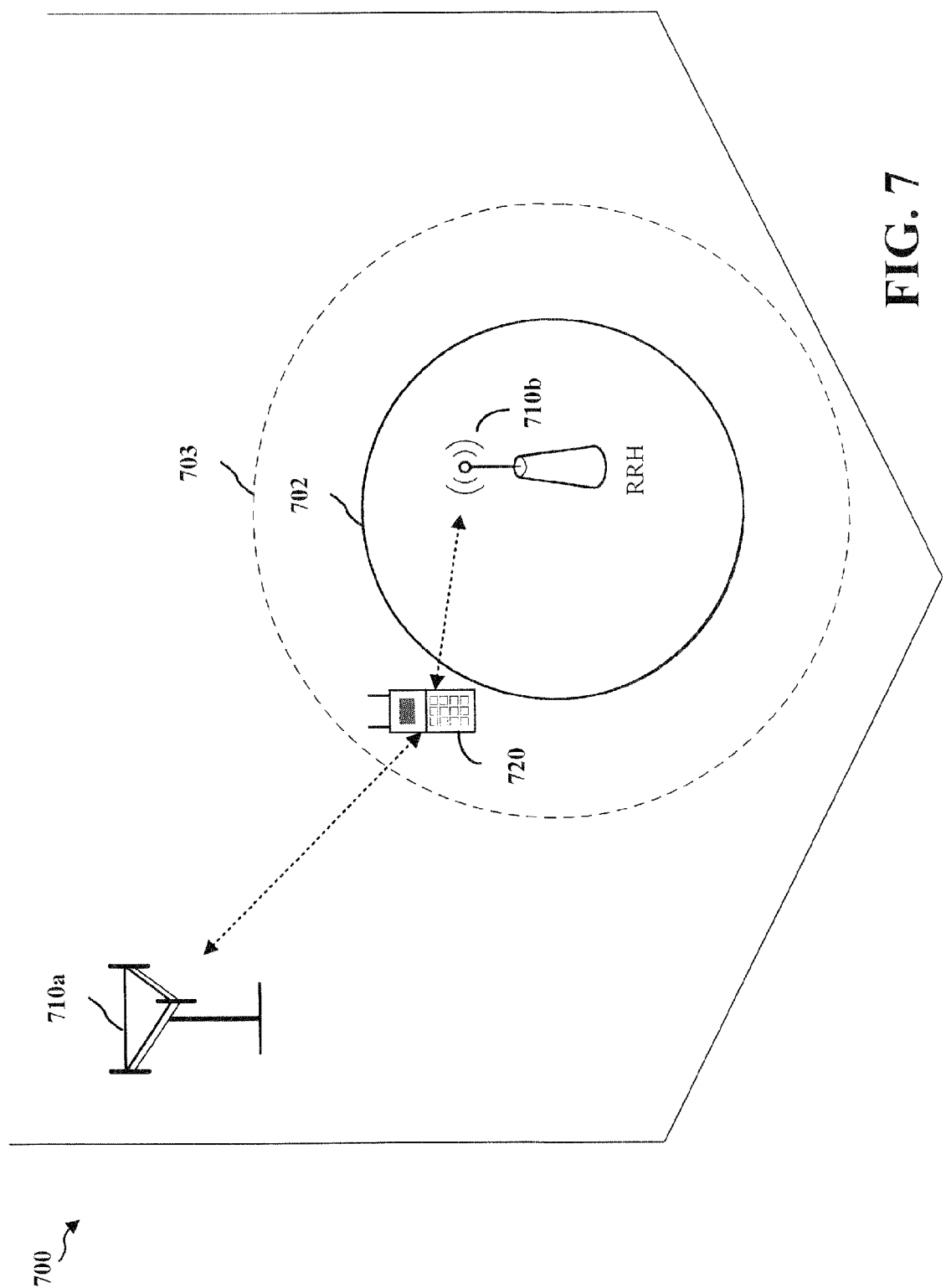
FIG. 7 is a diagram illustrating a range expanded cellular region in a heterogeneous network.

FIG. 7 is a diagram 700 illustrating a range expanded cellular region in a heterogeneous network. A lower power class eNB, such as the RRH 710b, may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
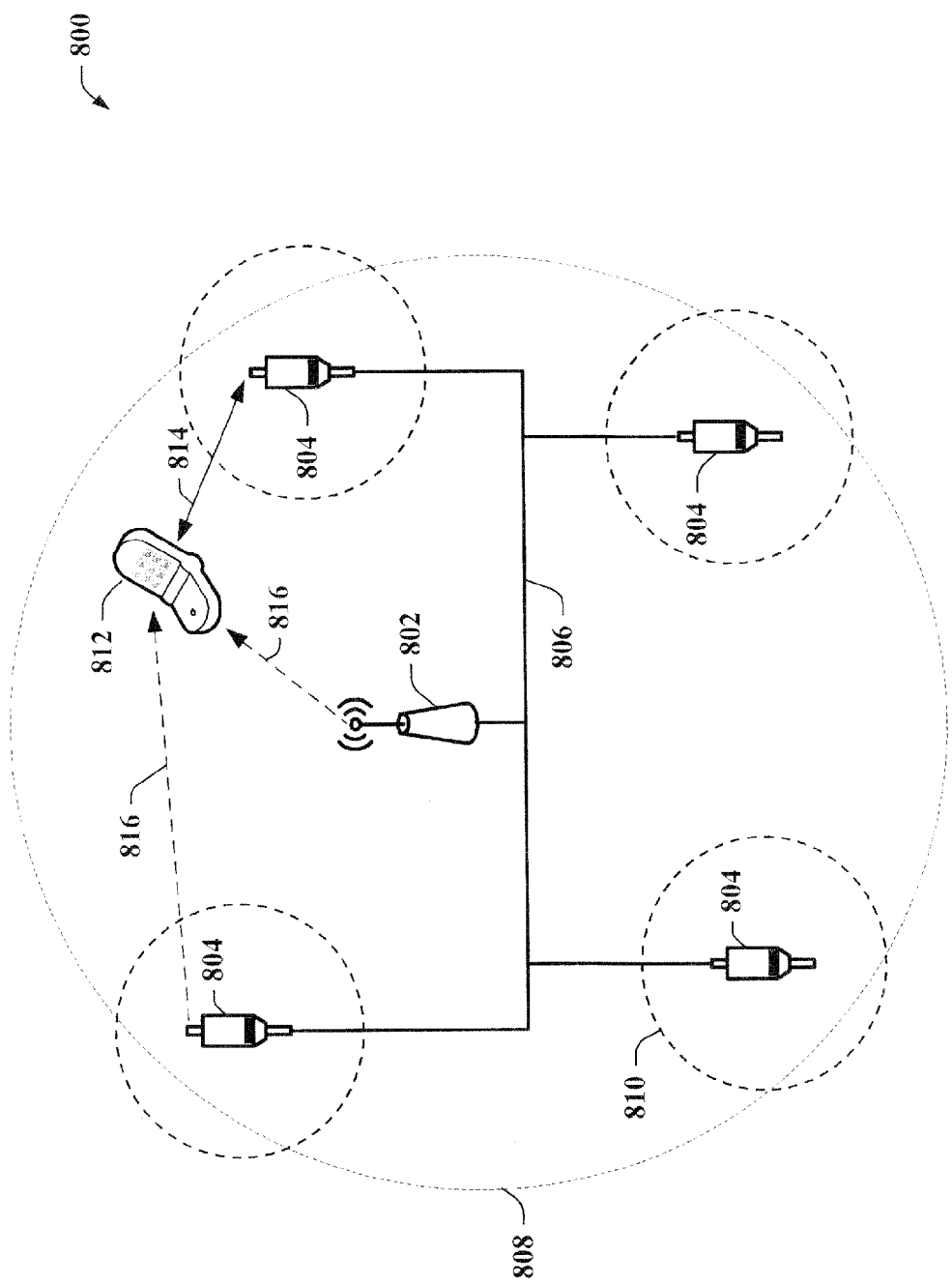
FIG. 8 is a diagram illustrating an example Macro eNB and RRH configuration in an access network.

FIG. 8 is a diagram illustrating an example Macro eNB and RRH configuration in access network 800. Access network 800 may include multiple cells. A cell may include macro eNB 802 and one or more RRHs 804. In one aspect, macro eNB 802 and RRHs 804 may be connected 806 through fiber cable, X2 backhaul, etc. Further, macro eNB 802 may provide a first coverage area 808 and RRH 804 may provide associated coverage areas 810. Generally, UE 812 may receive service from access network 800. In one aspect, the CRS is common across the whole cell, i.e., macro eNB 802 and RRHs 804 may transmit a common CRS.

In one aspect of UE 812, UE 812 may be enabled to use a wireless protocol for communications with the cell. Such communication protocols may include, but are not limited to, LTE release 8, LTE release 9, LTE release 10, LTE release 11, etc. To provide service to UE 812, channel estimation parameters may be obtained for a channel 814 to be used by UE 812, and interference estimation parameters may be obtained to measure interference 816. In one aspect, interference 816 may potentially originate from other RRHs 804, macro eNB 802, and/or other cells. Various schemes for channel estimation and interference estimations are now presented.

It is noted that an applicable channel estimation and/or interference estimation scheme may depend on the wireless protocol UE 812 is configured to use. In one aspect, UE 812 may be operable to measure a composite channel from the macro eNB 802 and/or the RRHs 804. This may be the case if UE 812 is limited to signaling based on LTE release 8 and/or LTE release 9. In such an aspect, interference estimation may be performed through use of a common cell-specific reference signal (CRS). In such an aspect, cell splitting may not be possible as the CRS is common across the whole cell. In one aspect, cell splitting may be possible for UEs 812 that are within a close proximity to RRH 804 (e.g., high geometry UEs). Further, the codebooks available to UE 812 may not be optimized for this configuration, and as such some performance loss may occur.

In one aspect of cell 808, the CRS may be transmitted by macro eNB 802 alone. In such an aspect, when macro eNB 802 transmits the CRS, outages may occur close to RRHs 804 due to automatic gain control (AGC) issues.

In another aspect of cell 808, the CRS may be transmitted by macro eNB 802 and RRHs 804. In such an aspect, antenna virtualization may be performed where macro eNB 802 is configured to transmit with a different number of antennas as RRHs 804. In other words, the macro eNB 802 ad RRHs 804 may increase or decrease a number of antenna ports in relation to a number of available physical antennas.

In another aspect of UE 812, UE 812 may be operable to measure a channel state information resource signal (CSI-RS) and a demodulation resource signal (DM-RS). This may be the case if UE 812 is a LTE release 10 enabled UE. As CSI-RS and DM-RS do not require a common, cell-specific configuration, cell splitting may be enabled by UE specific configuration of CSI-RS and DM-RS. In such a configuration, CRS may be used to communicate control information, and may be transmitted through macro eNB 802. Further, RRH 804 feedback may be obtained based on UE 812 specific values, such as CSI-RS, although the codebook may not be currently configured to effectively enable such feedback.

In a further advanced aspect, UE 812 may use a codebook which has been enhanced to allow for inter RRH 804 feedback, and as such allow for improved RRH 804 selection for UE 812 serving. This may be the case if UE 812 is an LTE release 11 enabled UE. Such a UE may be enabled to perform enhanced inter-cell interference coordination (eICIC).

In the aspect where UE 812 is operable to measure a composite channel from the macro eNB 802 and/or the RRHs 804 (e.g., if the UE is configured to use such a transmission mode), UE 812 may perform interference estimation. In such an aspect, the CRS signal may be used to measure interference contributions from other cells. By contrast, CRS may not be used to measure intra-cell interference because CQI feedback based on CRS may not be reliable as it is based on the assumption that macro and all RRHs transmit or that only macro transmits. In one aspect, sounding RS (SRS) measurements may be used by macro eNB 802 and may combine these measurements and UE 812 reports to form a combined estimate. An example of other cell interference measurements is discussed in FIG. 9. In an aspect in which only macro eNB 802 transmits the CRS, interference estimations may take into account potential contributions from RRHs 804 which may occur for PDSCH transmissions. In another similar aspect, a dedicated resource signal (RS) may be used to enable cell splitting. In such an aspect, interference estimations may be performed using reciprocity principles in TDD.

In the aspect where UE 812 is operable to measure a channel state information resource signal (CSI-RS) and a demodulation resource signal (DM-RS) (e.g., if the UE is, configured to use such a transmission mode), UE 812 may perform interference estimation. In such an aspect, a transmission mode, such as transmission mode 9 (TM9), may be used to enable processing of CSI-RS values. Further, as noted above, UE 812 may not be able to use CRS effectively for interference estimation within the cell, although CRS may be still used for cell interference estimations. In an aspect, CSI-RS muting may be used for interference estimation. Muting schemes are further discussed in FIGS. 10 and 11. In Operation, a muting scheme enables UEs 812 that receive data transmission from at least one RRH 804 or the macro eNB 802, to measure interference and noise originating from other transmission points (e.g., RRHs 804 and/or macro eNB 802). This estimation of interference and noise exploits the UE's knowledge that, on the resource elements designated by a muting pattern, the at least one serving transmission points (e.g., RRHs 804 and/or macro eNB 802) are muted. As such, the UE may capture interference from (e.g., PDSCH) transmissions from neighboring RRHs 804 and macro eNB 802 during the defined interval. In another aspect, channel estimation may be performed using a similar muting configuration. In still another aspect, so as to potentially reduce overhead transmissions, channel estimation CSI-RS may be embedded in a muting pattern. After channel estimation has been performed using the embedded values, the estimated channel contribution may be subtracted from the CSI-RS to allow for interference estimation. In still another aspect, MBSFN subframes may be used in channel and interference estimations. In such an aspect, the CRS transmissions during the MBSFN may be disabled. Further, other transmissions that occur during the MBSFN subframe may be disabled, such as system information blocks (SIBs).

Figure 9:
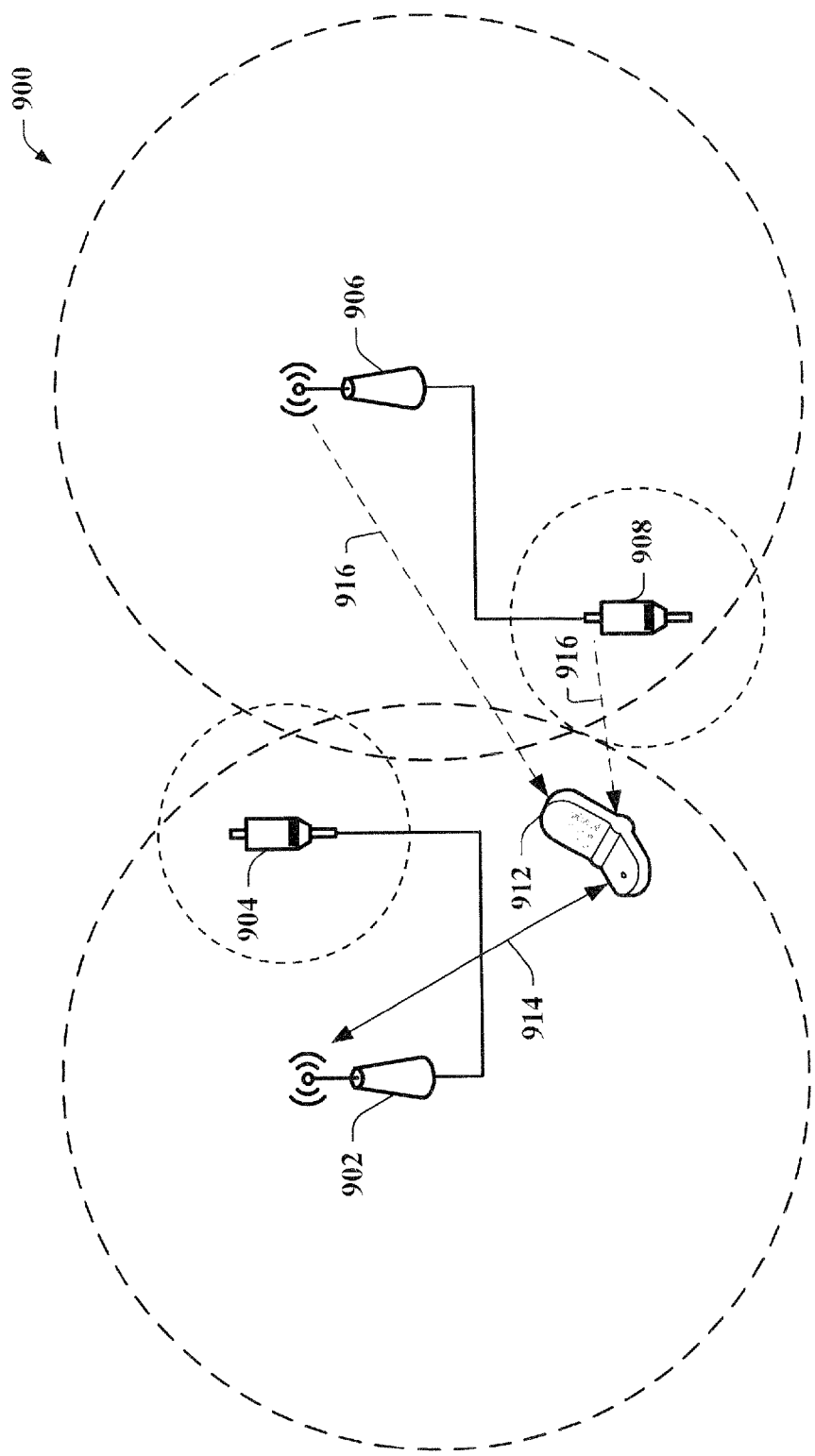
FIG. 9 is a diagram illustrating multiple Macro eNB/RRH cells in an access network.

FIG. 9 is a diagram illustrating multiple Macro eNB/RRH cells in an access network 900. As noted above, CRS may be used to measure out of cell interference values. The access network 900 depicted in FIG. 9 includes two cells, with a first cell including macro eNB 902 and RRH 904 and the second cell including macro eNB 906 and RRH 908. Generally, CRS from the first or second cells may be used to estimate out of cell interference contributions. For example, UE 912 may have a connection 914 with macro eNB 906 and may receive interference 916 from at least one of macro eNB 906 and a RRH 908. In such an aspect, CRS may be used for interference estimation across macro/RRH setups.

Figure 10:
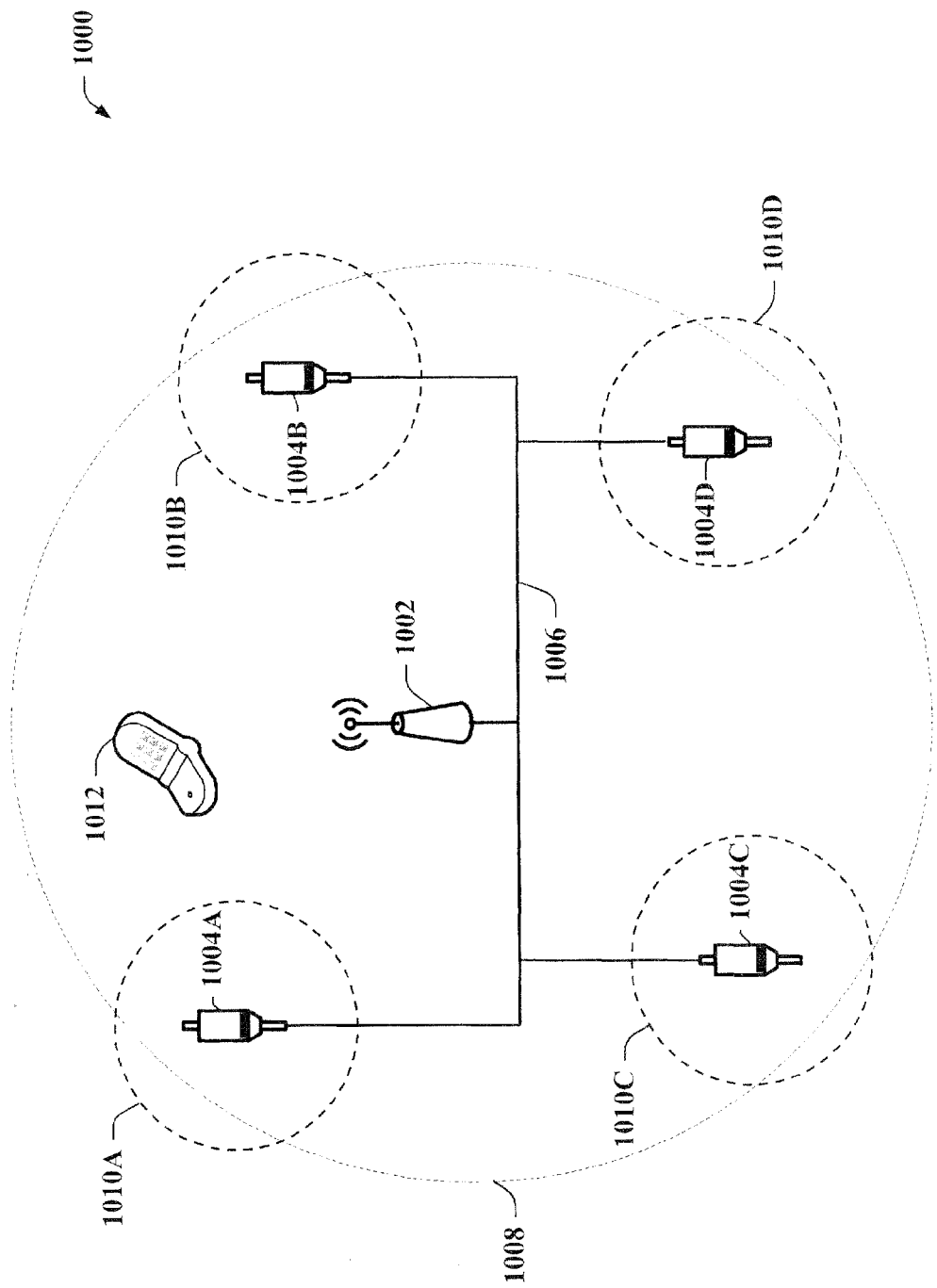
FIG. 10 is a diagram illustrating a cell including an evolved Node B and remote radio heads according to an aspect.

FIG. 10 is a diagram illustrating an example Macro/RRH cell in an access network 1000. Access network 1000 depicted in FIG. 10 includes a macro eNB 1002 and multiple RRHs (1004A, 1004B, 1004C, 1004D). Although four RRHs are depicted in FIG. 10, one of ordinary skill in the art understands that the subject matter is not limited to four RRHs. In one aspect, macro eNB 1002 and RRHs 1004 may be connected 1006 through fiber cable, X2 backhaul, etc. Further, macro eNB 1002 may provide a first coverage area 1008 and RRH (1004A, 1004B, 1004C, 1004D) may provide associated coverage areas (1010A, 1010B, 1010C, 1010D). In operation, a muting pattern may mute transmissions from one or more RRHs (1004A, 1004B, 1004C, 1004D) to reduce transmissions, and as such interference, originating from their coverage regions (1010A, 1010B, 1010C, 1010D). As such, a UE 1012 may use knowledge that on the resource elements designated by a muting pattern, the at least one serving transmission points (e.g., 1004A, 1004B, 1004C and/or 1004D) are muted. A codebook configuration for a muting pattern is discussed with reference to FIG. 11. It is further noted, that in the above described aspects, the cell may either have a single cell-ID or may have multiple cell-IDs. In one aspect, macro eNB 1002 may signal a plurality of identifiers (IDs) corresponding to a plurality of transmission points (1004A, 1004B, 1004C, 1004D) within the serving cell 1008.

Figure 11:
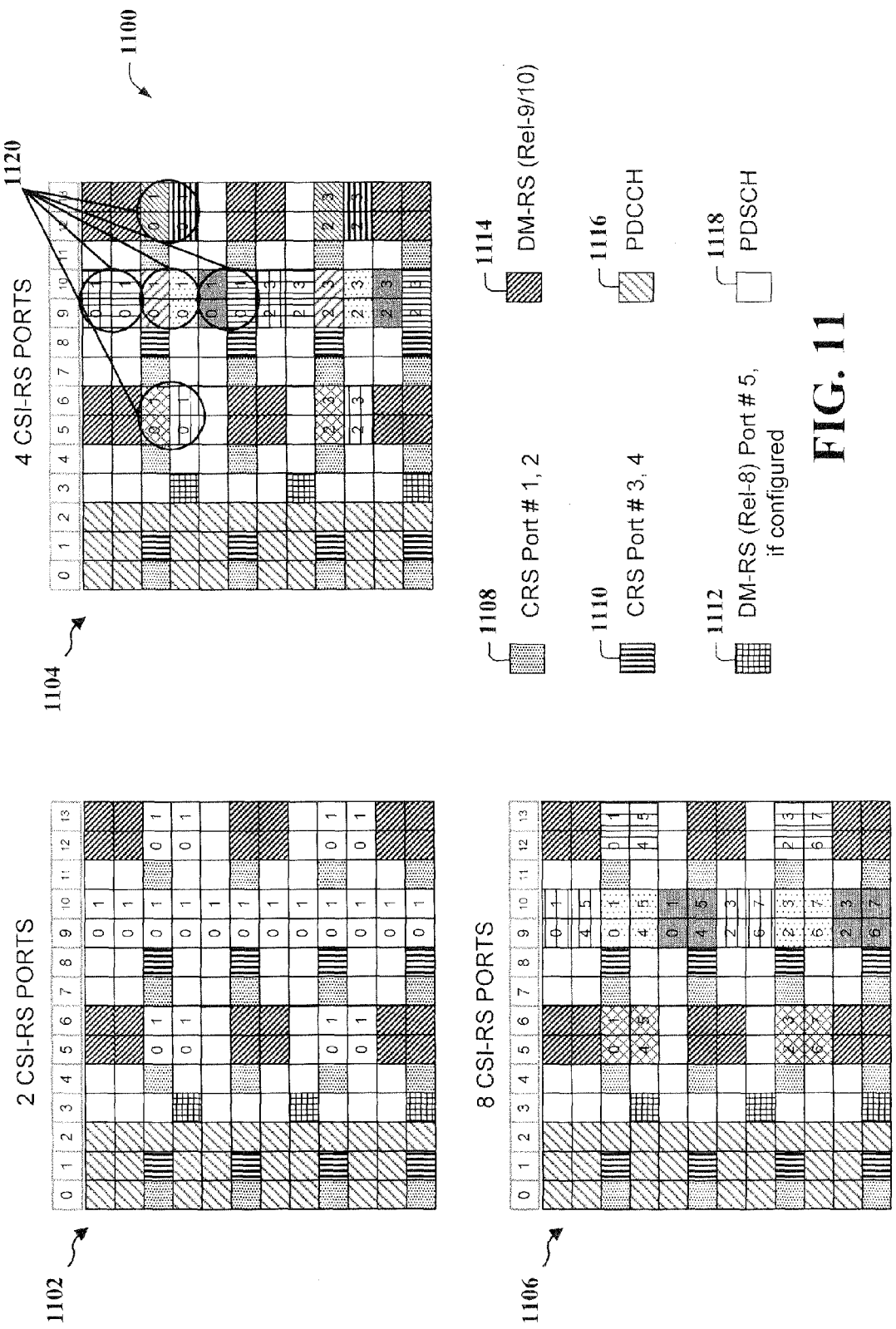
FIG. 11 is a diagram illustrating example codebook configurations associated with an RRH muting pattern according to an aspect.

FIG. 11 is a diagram illustrating example codebook configurations 1100 associated with an RRH muting pattern. Example codebooks 1100 are provided for two CSI-RS ports 1102, four CSI-RS ports 1104 and eight CSI-RS ports 1106. In operation, each CSI-RS port may be assigned to a different UE and/or multiple CSI-RS ports may be assigned to a single UE. The locations of various RSs are depicted using various shaded blocks. For example, the CRS ports 1 and 2, are depicted with reference to element 1108 and CRS ports 3 and 4 are depicted with reference to element 1110; the DM-RS (LTE release 8) and DM-RS (LTE release 9 and 10) ports are depicted with reference to element 1112 and 1114 respectively; PDCCH is depicted with reference to element 1116; and PDSCH is depicted with reference to element 1118. Further, CSI-RS groupings are depicted with reference to element 1120. During implementation of a muting pattern, different groupings of CSI-RS may be muted to allow for channel and/or interference estimations. Further, when muting configuration is based on 4 CSI-RS port pattern, there may be a total of 10 configurations for FDD (configured by higher layers). Still further, if two CSI-RS ports are configured for the RRH, the CSI-RS could be embedded into the muting pattern, and after channel estimation the embedded CSI-RS may be subtracted out to improve interference estimations.

CSI-RS 1120 muting may be configured such that at least some of the muted resources collide with PDSCH transmissions by other cells. The macro eNB/RRH network may adjust the interference and noise received by a UE on those resources to be representative of the interference and noise experienced by this LIE 1012 during downlink data transmission. Further, in LTE release-10, muting patterns follow CSI-RS patterns for 4 antenna ports, which allows for 10 patterns available for FDD configuration and normal cyclic prefix (CP) length. Note the number of patterns can be slightly different for other configurations. The macro/network may coordinate these patterns across the RRH setup.

A CSI-RS pattern configured for a UE for channel estimation may overlap with the muting pattern. In one aspect, a partially overlapping configuration may provide a benefit to overhead usage. In one such aspect, if a UE is configured for CSI-RS feedback with 1 or 2 antenna ports, it is therefore possible to embed this pattern into the muting pattern such that the REs corresponding to the CSI-RS pattern are not muted. The CSI-RS pattern can then be used for channel estimation, after which its contribution can be subtracted and both the muted REs and the REs originally used for CSI-RS can be used for interference estimation.

For UE capable of performing eICIC (e.g., a LTE release 11 enabled UE), specific muting patterns may be used for interference estimation or for improving another cell's channel estimation performance. In one aspect, a LTE release UE may be operable to perform enhanced inter-cell interference coordination (eICIC). Depending on which purpose is intended for the muting pattern, interference encountered in both cases could be quite different. Having such signaling may enable a UE to use muting for both purposes.

Figure 12:
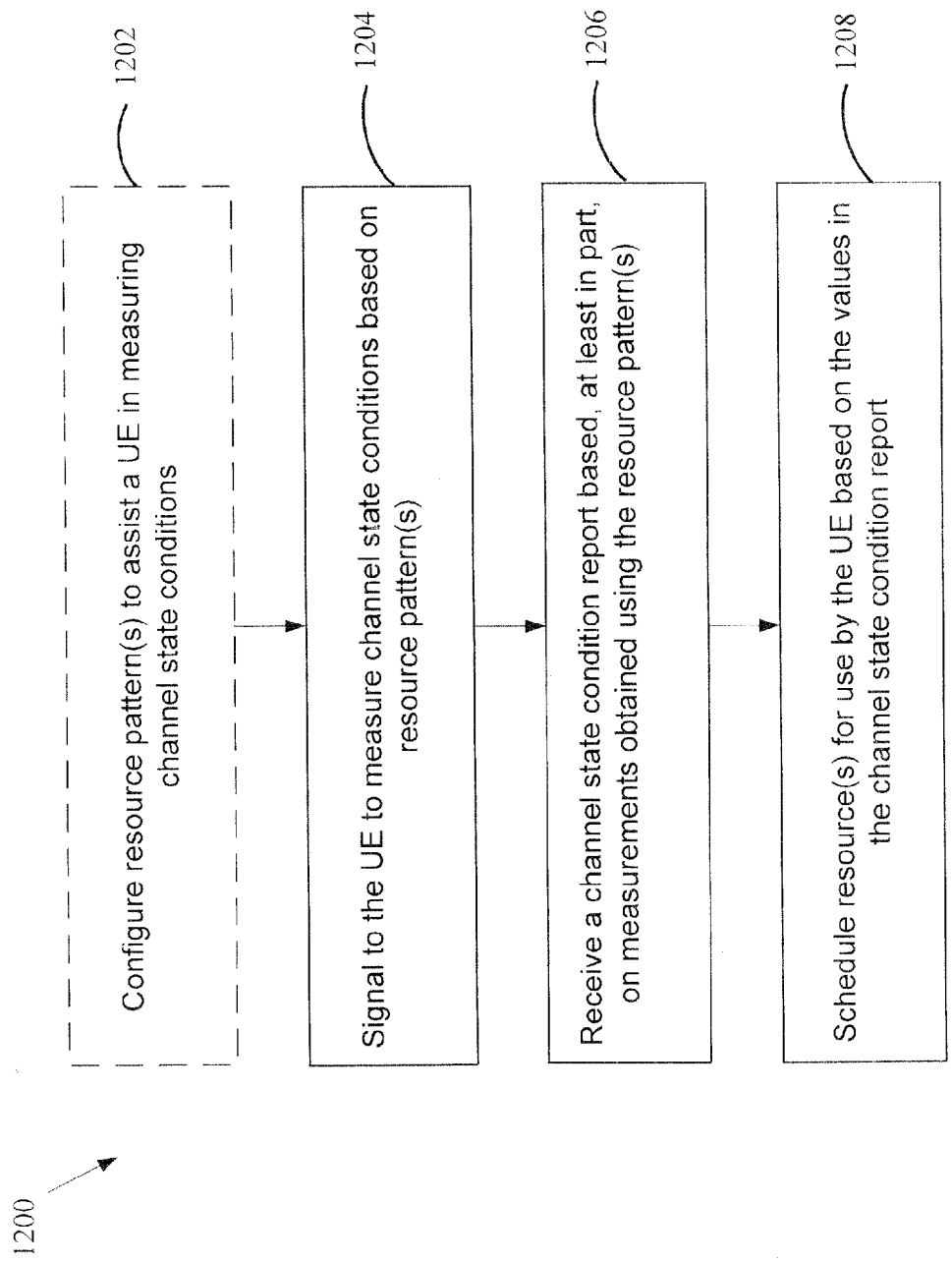
FIG. 12 is a flow chart of a method of wireless communication.

FIG. 12 is a flow chart 1200 of a method of wireless communication. In FIG. 12, boxes with dashed borders represent optional steps in the disclosed methods.

In one optional aspect, at block 1202, a macro eNB may configure two or more resources patterns to assist a UE in measuring channel state conditions. In one aspect, the two or more resource patterns may be semi-statically configured. As used herein, semi-static configuration may refer to configuring the two or more resource patterns, indefinitely, for a set time, etc.

At block 1204, at least a macro eNB may signal to the UE to measure channel state conditions based on at least a first resource pattern and a second resource pattern. In one aspect, the signaling may be transmitted from the macro eNB alone, while in another aspect, the signaling may be transmitted from the macro eNB and/or one or more RRHs. As used herein, measures of channel conditions may refer to channel estimation measurements and channel interference measurements. In one aspect, the first resource pattern may identify resources for channel estimation, and the second resource pattern may identify resources for interference estimation. In such an aspect, the first resource pattern may be a CSI-RS pattern and the second resource pattern may be a CRS pattern. In another aspect, the first resource pattern may be further processed by subtracting one or more pilot signals from the corresponding first resource pattern resources, and the processed first resource pattern may also be used for interference estimation. Further, both the first and second resource pattern may be CSI-RS patterns. In an optional aspect, a third resource pattern may be signaled, where the first resource pattern may identify resources for a channel estimation for one or more signals from one or more coordinating transmission points, the second resource pattern may identify resources for an interference estimation pattern for one or more signals, and the third resource pattern may identify resources for an interference estimation for one or more signals from outside the one or more coordinating transmission points. In such an aspect, the third resource pattern may correspond to one or more CRS patterns of the one or more coordinating transmission points. Further, in one aspect, the UE may be operable to perform eICIC. In another aspect, the signaling may also include IDs corresponding to the one or more transmission points (e.g., macro eNB and/or RRHs), and the one or more transmission points may coordinate signals on one or more of the resource patterns (e.g., the first and/or second resource patterns) to correspond to transmissions by the one or more transmission points during expected transmissions to the UE.

At block 1206, the macro eNB may receive a channel state conditions report from the UE. In one aspect, channel state condition values included in the report may be derived at least in part from measurements taken by the UE using the first resource pattern and second resource pattern. In other words, the channel state condition report includes information that may be based on channel estimation values and channel interference values.

At block 1208, the macro eNB may schedule one or more resource for use by the UE based at least in part on the information received in the channel state condition report. The macro eNB may consider other factors, such as macro eNB derived measurements, cell loading, network derived measurements, channel state condition reports from other UEs, etc., in determining which resources to schedule for a UE.

Figure 13:
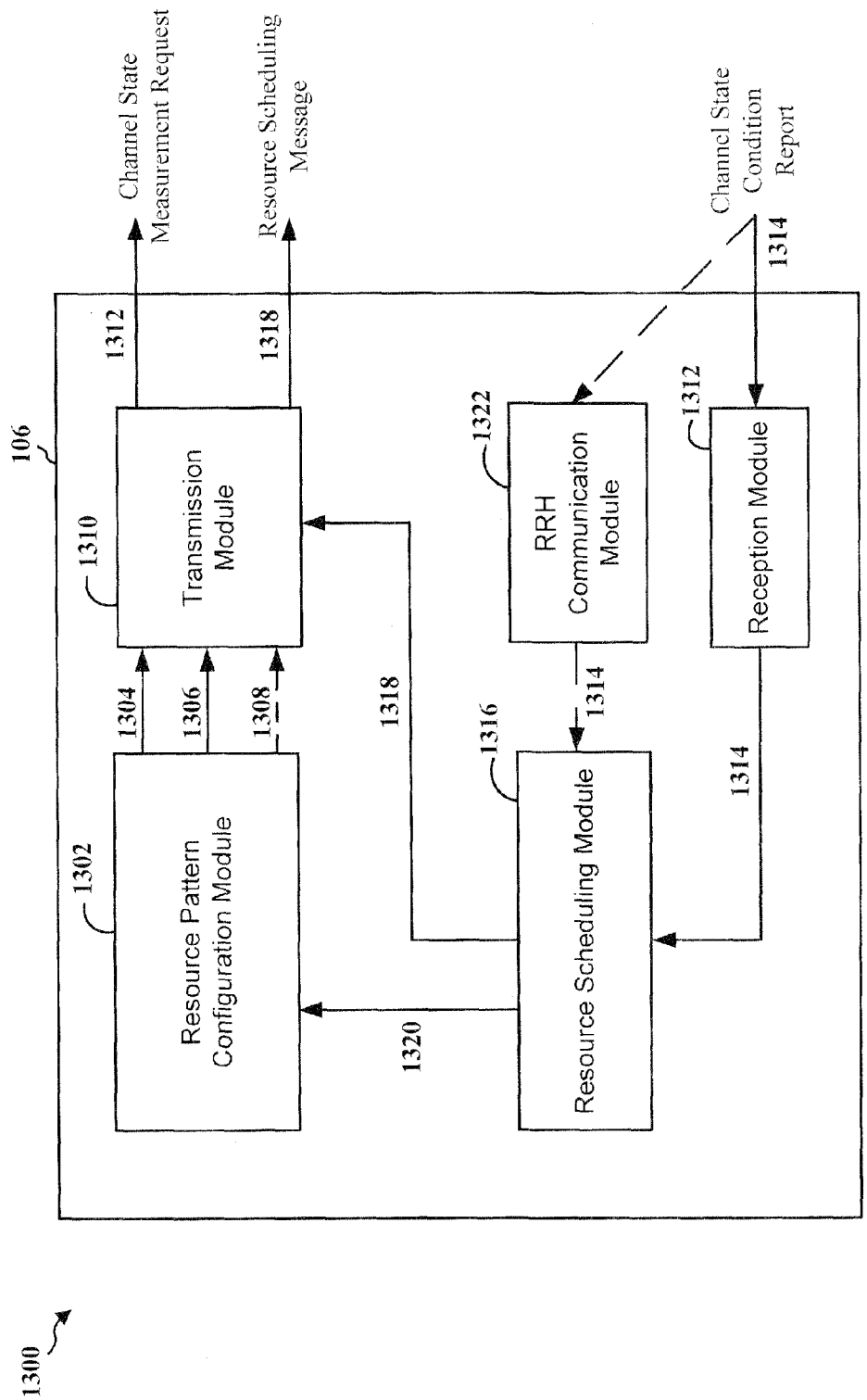
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 106. The apparatus 106 includes a module 1302 that may configure various resource patterns to assist a UE in channel state measurements. In one aspect, channel state conditions may include channel estimation and interference estimation. In one aspect, resource pattern configuration module 1302 may configure patterns on a semi-static basis. Further, resource pattern configuration module 1302 may configure a first resource pattern 1304 to assist a UE in channel estimation measurements, and a second resource pattern 1306 to assist a UE in channel interference measurements. In one aspect, each of the first and second resource patterns may be CRS, CSI-RS, etc., patterns. In an optional aspect, resource pattern configuration module 1302 may further configure a third resource pattern 1308 to assist in interference estimation from outside a set of coordinating transmission points (e.g., the serving cell). In such an optional aspect, the third resource pattern 1308 may be a CRS pattern. Apparatus 106 may further include transmission module 1310 that signals the resource patterns to the UE as part of a channel state measurement request 1312.

Further, apparatus 106 may include a reception module 1312 that receives a channel state condition report 1314 from the UE, and a module 1316 that schedules resources for use by a UE based at least in part on the values included in the channel state condition report 1314. Apparatus 106 may further include RRH communication module 1322 that may communicate channel state condition report 1314 received from one or more RRHs to resource scheduling module 1316. Thereafter, resource scheduling module 1316 may communicate a resource scheduling message 1318 through transmission module 1310. Further, resource scheduling module 1316 may provide channel state feedback 1320 to resource pattern configuration module 1302 to potentially assist in generation of improved resource patterns.

The apparatus may include additional modules that perform each of the steps of the algorithm in the aforementioned flow charts FIG. 12. As such, each step in the aforementioned flow charts FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
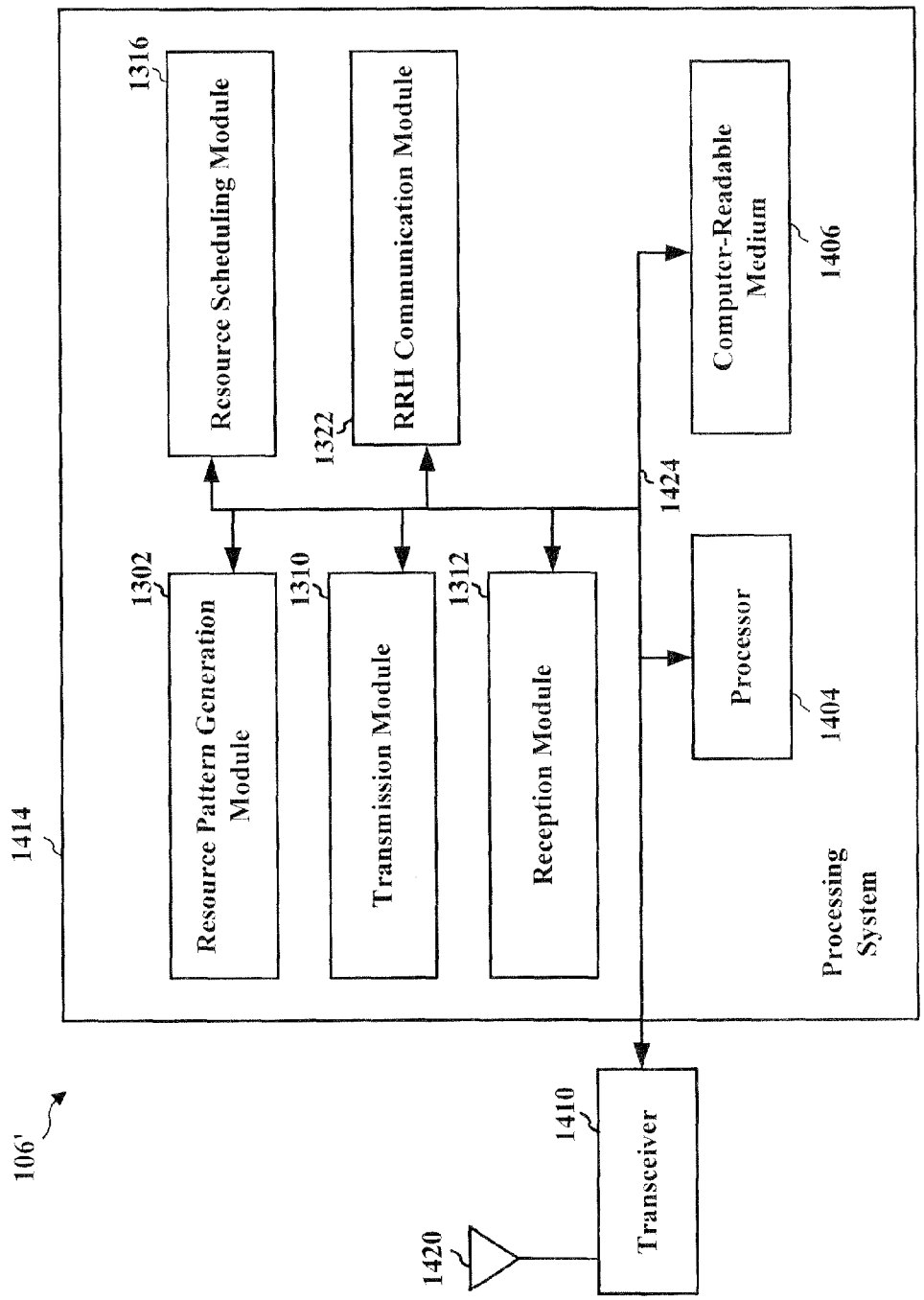
FIG. 14 is a diagram illustrating an example of a hardware implementation for an apparatus employing a processing system.

FIG. 14 is a diagram illustrating an example of a hardware implementation for an apparatus 106' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1302, 1310, 1312, 1316, 1322, and the computer-readable medium 1406. The bus 1424 may also link various other circuits such as timing sources, peripherals, voltage regulators, and power management circuits, which are well known in the art, and therefore, will not be described any further.

The apparatus includes a processing system 1414 coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes modules 1302, 1310, 1312, 1316 and 1322. The modules may be software modules running in the processor 1404, resident/stored in the computer readable medium 1406, one or more hardware modules coupled to the processor 1404, or some combination thereof. The processing system 1414 may be a component of the eNB 610 and may include the memory 676 and/or at least one of the TX processor 616, the RX processor 670, and the controller/processor 675.

Figure 15:
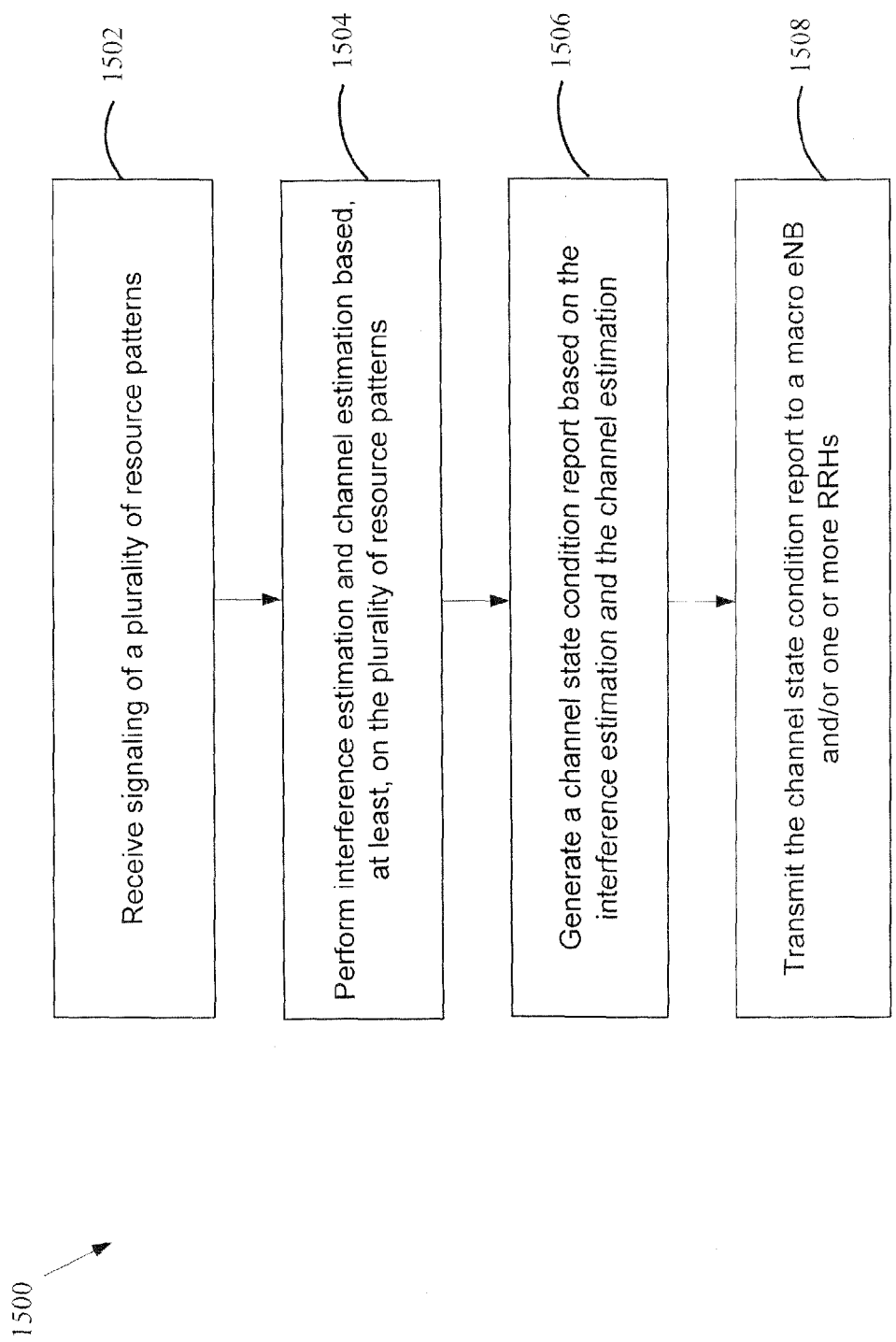
FIG. 15 is a flow chart of another method of wireless communication.

FIG. 15 is a flow chart 1500 of a method of wireless communication.

At block 1502, a UE may receive signaling including at least a first resource pattern and a second resource pattern. In one aspect, the signaling may be received from macro eNB alone, while in another aspect, the signaling may be received from any combination of the macro eNB and/or one or more RRHs. In one aspect, the first resource pattern may be used for channel estimation, and the second resource pattern may be used for interference estimation. In such an aspect, the first resource pattern may be a CSI-RS pattern and the second resource pattern may be a CRS pattern. In one aspect, one or more CRS patterns received from one or more transmission points may be used for interference estimation Further, both the first and second resource pattern may be CSI-RS patterns. In one aspect, a third resource pattern may be signaled, where the first resource pattern may be used for a channel estimation for one or more signals from within a serving cell, the second resource pattern may be used for an interference estimation pattern for one or more signals from within the serving cell, and the third resource pattern may be used for an interference estimation for one or more signals from outside the set of coordinating transmission points (e.g., the serving cell). In such an aspect, the third resource pattern may correspond to one or more CRS patterns corresponding to the one or more transmission points. Further, in one aspect, the UE may be operable to perform eICIC. In another aspect, the signaling may also include IDs corresponding one or more transmission points (e.g., macro eNB and/or RRHs) within the serving cell, and the macro eNB and plurality of transmission points may coordinate signals from a plurality of transmission points within the serving cell on one of the resource patterns (e.g., the second resource pattern) to correspond to transmissions by the plurality of transmission points during expected transmissions to the UE.

At block 1504, the UE may perform interference estimation based, at least in part, on the first resource pattern, and channel estimation based, at least in part, on the second resource pattern. In another aspect, where a third resource pattern is received, the UE may use the third resource pattern to assist in determining out of cell interference. In another aspect, wherein the first and second resource patterns include CRI-RS patterns, the UE may measure interference on a CSI-RS pattern of the CSI-RS patterns that may be known not to be transmitted (e.g., muted).

At block 1506, the UE may generate a channel state condition report based, at least in part, on both the interference estimations and the channel estimations. In one aspect, the interference estimation may include estimations for both interference values from within and from outside the set of coordinating transmission points.

At block 1508, the UE may transmit the channel state condition report to the serving macro eNB and/or one or more RRHs. In response to the channel state condition report, the UE may receive a resource scheduling message indicating which resource and/or resources are assigned to the UE.

Figure 16:
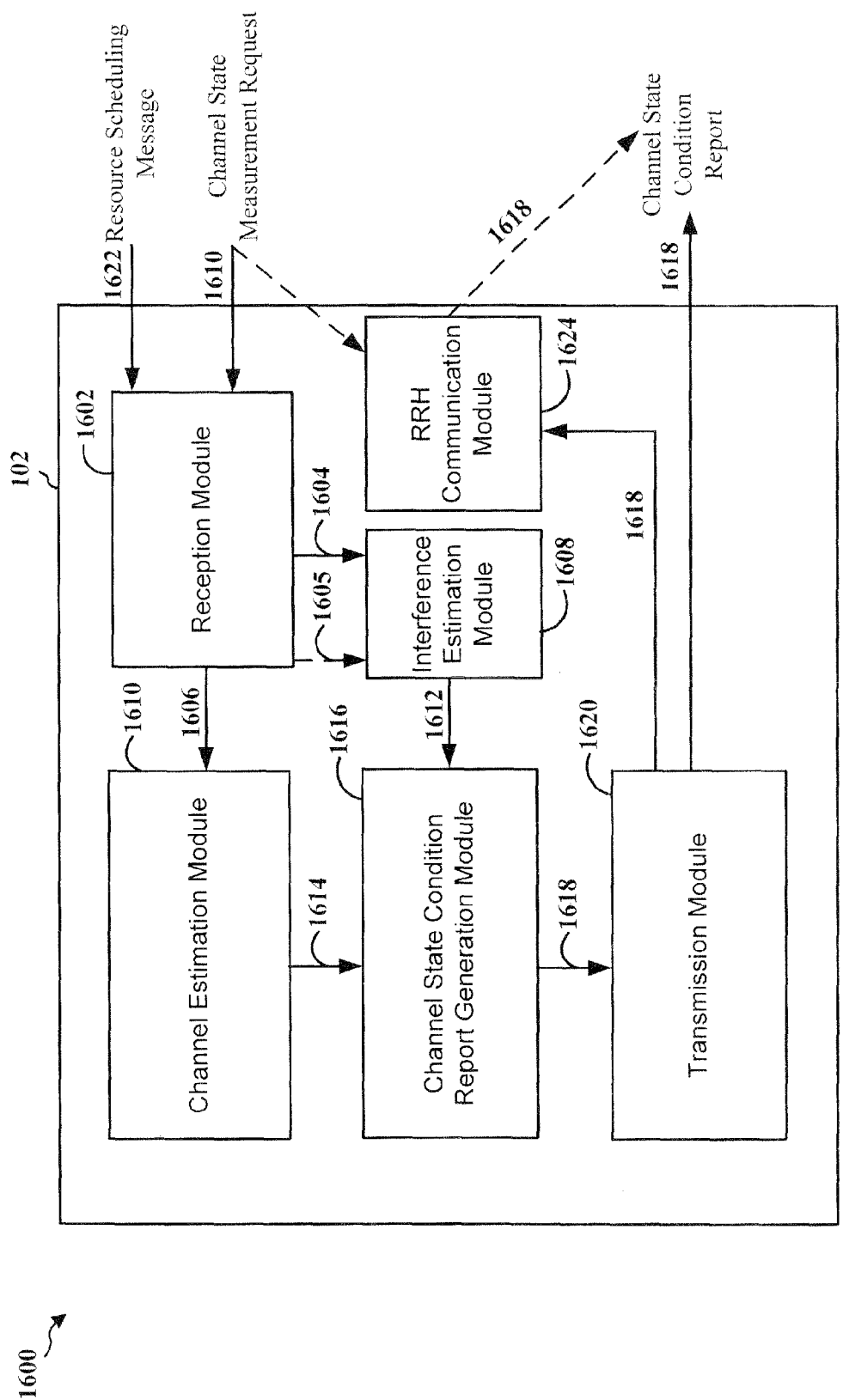
FIG. 16 is a conceptual data flow diagram illustrating the data flow between different modules/means/components in another exemplary apparatus.

FIG. 16 is a conceptual data flow diagram 1600 illustrating the data flow between different modules/means/components in an exemplary apparatus 102. The apparatus 102 includes a reception module 1602 that receives a channel state measurement request message 1610. In one aspect, apparatus 102 may further include RRH communication module 1624 that may communicate channel state measurement request message 1610 received from a RRH to reception module 1602. In one aspect, the channel state measurement request message 1610 may include a first resource pattern 1604 and a second resource pattern 1606. In an optional aspect, the channel state measurement request message 1610 may further include a third resource pattern 1605. Apparatus 102 may further include interference estimation module 1608 that uses knowledge of the second resource pattern 1604 to perform interference measurements. In one aspect, interference estimation module 1608 may further use the third resource pattern to estimate interference from outside the set of coordinating transmission points. The interference estimation value and/or values 1612 determined by interference estimation module 1608 may be communicated to channel state condition report generation module 1616. Apparatus 102 may further include channel estimation module 1610 that may use the first resource pattern 1606 to estimate channel conditions. The channel estimation value 1614 determined by channel estimation module 1610 may be communicated to channel state condition report generation module 1616. Apparatus 102 may further include channel state condition report generation module 1616 that may generate a channel state condition report 1618 based at least on the interference estimation value and/or values 1612 and the channel estimation value 1614. Apparatus 102 may further include transmission module 1620 that transmits the channel state condition report 1618 to the macro eNB. In one aspect, transmission module 1620 may communicate channel state condition report 1618 to RRH communication module 1624 so as to allow RRH communication module 1624 to transmit channel state condition report 1618 to a RRH. In one aspect, reception module 1602 may receive a resource scheduling message 1622 from the macro eNB in response to the transmission of the channel state condition report 1618.

The apparatus may include additional modules that perform each of the steps of the algorithm in the aforementioned flow charts FIG. 15. As such, each step in the aforementioned flow chart FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
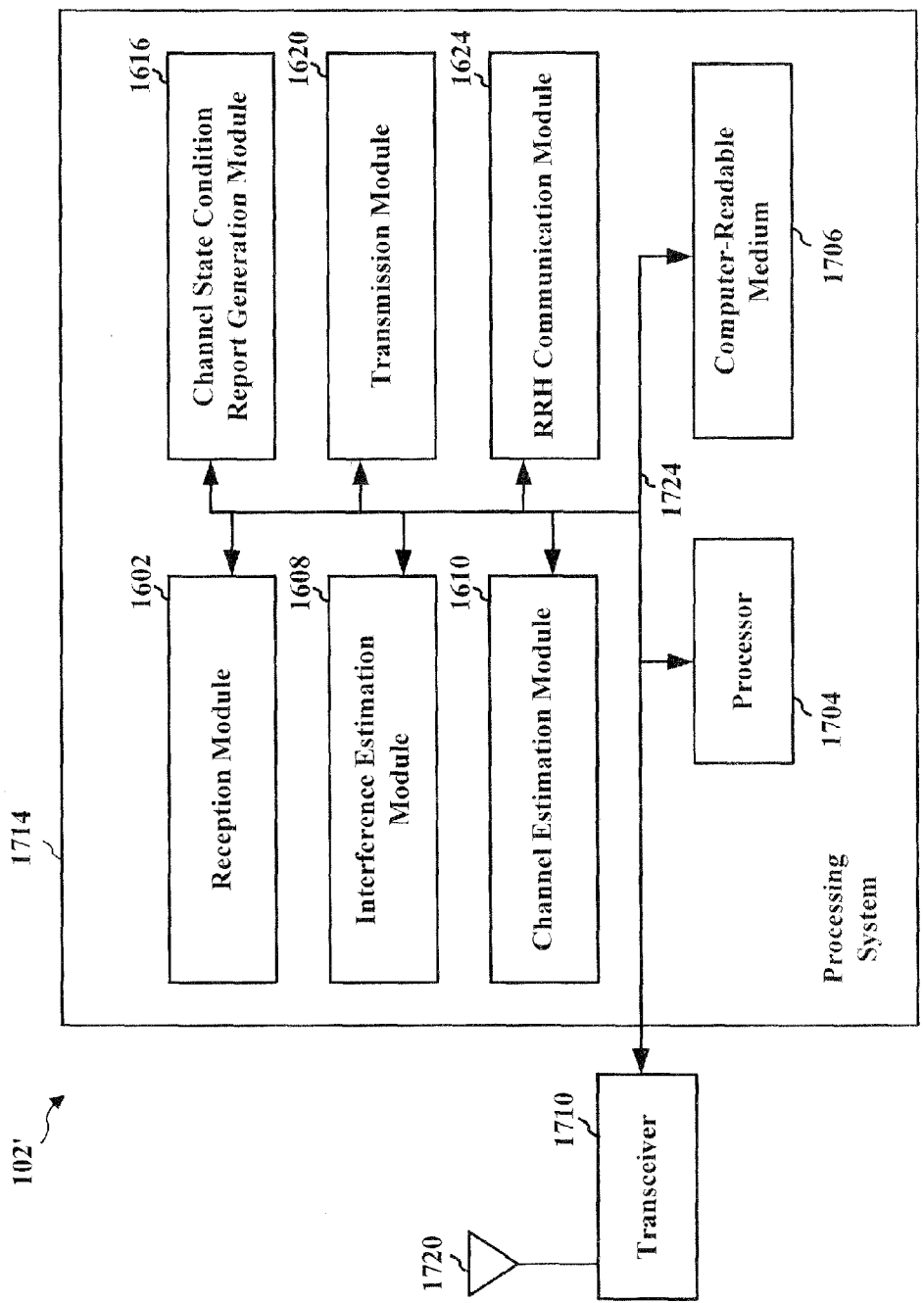
FIG. 17 is a conceptual block diagram illustrating the functionality of still another exemplary apparatus.

FIG. 17 is a diagram illustrating an example of a hardware implementation for an apparatus 102' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1602, 1608, 1610, 1616, 1620, 1624, and the computer-readable medium 1706. The bus 1724 may also link various other circuits such as timing sources, peripherals, voltage regulators, and power management circuits, which are well known in the art, and therefore, will not be described any further.

The apparatus includes a processing system 1714 coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes modules 1602, 1608, 1610, 1616, 1620, and 1624. The modules may be software modules running in the processor 1704, resident/stored in the computer readable medium 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
   signaling to a user equipment (UE), from a serving cell, to measure channel state conditions based on a first resource pattern, a second resource pattern, and a third resource pattern, the first resource pattern identifying resources for a channel estimation on which a first transmission point located within the serving cell transmits reference signals and the second resource pattern identifying resources for an interference estimation on which a second transmission point located within the serving cell transmits the reference signals and on which the first transmission point does not transmit the reference signals, wherein
   the first resource pattern identifies the resources for the channel estimation for one or more signals from one or more coordinating transmission points,
   the second resource pattern is a muted resource pattern that collides with a data transmission from the first transmission point to the UE, and
   the third resource pattern identifies resources for an interference estimation for one or more signals from outside the one or more coordinating transmission points;
   receiving a channel state condition report from the UE based, at least in part, on measurements obtained using the first resource pattern and second resource pattern; and
   scheduling one or more resources for use by the UE based on the received channel state condition report.

2. The method of claim 1, wherein the third resource pattern corresponds to one or more common reference signal (CRS) patterns of the one or more coordinating transmission points.

3. The method of claim 1, wherein the signaling to the UE to measure channel state conditions further comprises signaling one or more of identifiers (IDs) corresponding to the one or more coordinating transmission points.

4. The method of claim 1, further comprising coordinating transmissions from the at least one of the one or more coordinating transmission points such that interference observed by the UE on the second resource pattern from the at least one of the one or more transmission points corresponds to expected transmissions by the one or more transmission points during transmissions to the UE.

5. The method of claim 1, wherein the channel state conditions include channel and interference estimation information.

6. The method of claim 5, wherein the interference estimation is based, at least in part, on the first resource pattern resources as filtered to remove or minimize the presence of one or more pilot signals.

7. The method of claim 1, wherein the first resource pattern is a first channel state information reference signal (CSI-RS) pattern, and wherein the second resource pattern is a second CSI-RS pattern.

8. The method of claim 1, further comprising:
   semi-statically configuring at least one of the first resource pattern, the second resource pattern or the third resource pattern for signaling to the UE to measure the channel state conditions.

9. The method of claim 1, wherein:
   the first resource pattern comprises a non-muted CSI-RS pattern where the first transmission point transmits on the non-muted CSI-RS pattern, and
   the second resource pattern comprises a muted CSI-RS pattern where the first transmission point does not transmit on the muted CSI-RS pattern.

10. A method of wireless communications, comprising:
    receiving, by a user equipment (UE), signaling of a first resource pattern, a second resource pattern, and a third resource pattern from a serving cell, the first resource pattern identifying resources for a channel estimation on which a first transmission point located within the serving cell transmits reference signals and the second resource pattern identifying resources for an interference estimation on which a second transmission point located within the serving cell transmits the reference signals and on which the first transmission point does not transmit the reference signals, wherein the second resource pattern is a muted resource pattern that collides with a data transmission from the first transmission point to the UE, and wherein the first and second resource patterns comprise channel state information reference signal (CSI-RS) patterns, respectively;
    performing channel estimation based at least in part on the first resource pattern, and interference estimation for one or more signals from outside one or more transmission points based at least in part on the second resource pattern and the third resource pattern;
    generating a channel state condition report based on the interference estimation and the channel estimation; and
    transmitting the channel state condition report to one or more transmission points.

11. The method of claim 10, wherein the third resource pattern corresponds to one or more common reference signal (CRS) patterns corresponding to the one or more transmission points.

12. The method of claim 10, wherein the performing interference estimation further comprises:
    measuring interference on a muted CSI-RS pattern of the first and second resource patterns where at least one of the one or more transmission points are not transmitting on the muted CSI-RS pattern, and wherein a non-muted CSI-RS pattern of the first and second resources patterns is filtered to remove or minimize the presence of one or more pilot signals.

13. The method of claim 10, wherein:
    the first resource pattern comprises a non-muted CSI-RS pattern where the first transmission point transmits on the non-muted CSI-RS pattern, and
    the second resource pattern comprises a muted CSI-RS pattern where the first transmission point does not transmit on the muted CSI-RS pattern.

14. An apparatus for wireless communication, comprising:
- means for signaling to a user equipment (UE), from a serving cell, to measure channel state conditions based on a first resource pattern, a second resource pattern, and a third resource pattern, the first resource pattern identifying resources for a channel estimation on which a first transmission point located within the serving cell transmits reference signals and the second resource pattern identifying resources for an interference estimation on which a second transmission point located within the serving cell transmits the reference signals and on which the first transmission point does not transmit the reference signals, wherein
- the first resource pattern identifies the resources for the channel estimation for one or more signals from one or more coordinating transmission points,
- the second resource pattern is a muted resource pattern that collides with a data transmission from the first transmission point to the UE, and
- the third resource pattern identifies resources for an interference estimation for one or more signals from outside the one or more coordinating transmission points;
- means for receiving a channel state condition report from the UE based, at least in part, on measurements obtained using the first resource pattern and second resource pattern; and
- means for scheduling one or more resources for use by the UE based on the received channel state condition report.

15. The apparatus of claim 14, wherein the third resource pattern corresponds to one or more common reference signal (CRS) patterns of the one or more coordinating transmission points.

16. The apparatus of claim 14, wherein the means for signaling to the UE to measure channel state conditions further comprises means for signaling one or more of identifiers (IDs) corresponding to the one or more coordinating transmission points.

17. The apparatus of claim 16, further comprising means for coordinating transmissions from the at least one of the one or more coordinating transmission points such that interference observed by the UE on the second resource pattern from the at least one of the one or more transmission points corresponds to expected transmissions by the one or more transmission points during transmissions to the UE.

18. The apparatus of claim 14, wherein the channel conditions include channel and interference estimation information.

19. The apparatus of claim 18, wherein the interference estimation is based, at least in part, on the first resource pattern resources as filtered to remove or minimize the presence of one or more pilot signals.

20. The apparatus of claim 14, wherein the first resource pattern is a first channel state information reference signal (CSI-RS) pattern, and wherein the second resource pattern is a second CSI-RS pattern.

21. The apparatus of claim 14, further comprising:
- means for semi-statically configuring at least one of the first resource pattern, the second resource pattern, or the third resource pattern for signaling to the UE to measure the channel state conditions.

22. A apparatus for wireless communications, comprising:
- means for receiving, by a user equipment (UE), signaling of a first resource pattern, a second resource pattern, and a third resource pattern from a serving cell, the first resource pattern identifying resources for a channel estimation on which a first transmission point located within the serving cell transmits reference signals and the second resource pattern identifying resources for an interference estimation on which a second transmission point located within the serving cell transmits the reference signals and on which the first transmission point does not transmit the reference signals, wherein the second resource pattern is a muted resource pattern that collides with a data transmission from the first transmission point to the UE, and wherein the first and second resource patterns comprise channel state information reference signal (CSI-RS) patterns, respectively;
- means for performing channel estimation based at least in part on the first resource pattern, and means for performing interference estimation for one or more signals from outside one or more transmission points based at least in part on the second resource pattern and the third resource pattern;
- means for generating a channel state condition report based on the interference estimation and the channel estimation; and
- means for transmitting the channel state condition report to the one or more transmission points.

23. The apparatus of claim 22, wherein the third resource pattern corresponds to one or more common reference signal (CRS) patterns corresponding to the one or more transmission points.

24. The apparatus of claim 22, wherein the means for performing interference estimation further comprises:
- means for measuring interference on a muted CSI-RS pattern of the first and second resource patterns where at least one of the one or more transmission points are not transmitting on the muted CSI-RS pattern, and wherein a non-muted CSI-RS pattern of the first and second resources patterns is filtered to remove or minimize the presence of one or more pilot signals.

25. A non-transitory computer-readable medium storing computer executable code for wireless communication, comprising code for:
- signaling to a user equipment (UE), from a serving cell, to measure channel state conditions based on a first resource pattern, a second resource pattern, and a third resource pattern, the first resource pattern identifying resources for a channel estimation on which a first transmission point located within the serving cell transmits reference signals and the second resource pattern identifying resources for an interference estimation on which a second transmission point located within the serving cell transmits the reference signals and on which the first transmission point does not transmit the reference signals, wherein
- the first resource pattern identifies the resources for the channel estimation for one or more signals from one or more coordinating transmission points,
- the second resource pattern is a muted resource pattern that collides with a data transmission from the first transmission point to the UE, and
- the third resource pattern identifies resources for an interference estimation for one or more signals from outside the one or more coordinating transmission points;
- receiving a channel state condition report from the UE based, at least in part, on measurements obtained using the first resource pattern and second resource pattern; and scheduling one or more resources for use by the UE based on the received channel state condition report.

26. The non-transitory computer-readable medium of claim 25, wherein the third resource pattern corresponds to one or more common reference signal (CRS) patterns of the one or more coordinating transmission points.

27. The non-transitory computer-readable medium of claim 25, wherein the code for signaling to the UE to measure channel state conditions further comprises code for signaling one or more of identifiers (IDs) corresponding to the one or more coordinating transmission points.

28. The non-transitory computer-readable medium of claim 27, further comprising code for coordinating transmissions from the at least one of the one or more coordinating transmission points such that interference observed by the UE on the second resource pattern from the at least one of the one or more transmission points corresponds to expected transmissions by the one or more transmission points during transmissions to the UE.

29. The non-transitory computer-readable medium of claim 25, wherein the channel conditions include channel and interference estimation information.

30. The non-transitory computer-readable medium of claim 29, wherein the interference estimation is based, at least in part, on the first resource pattern resources as filtered to remove or minimize the presence of one or more pilot signals.

31. The non-transitory computer-readable medium of claim 25, wherein the first resource pattern is a first channel state information reference signal (CSI-RS) pattern, and wherein the second resource pattern is a second CSI-RS pattern.

32. The non-transitory computer-readable medium of claim 25, further comprising code for:
  semi-statically configuring at least one of the first resource pattern, the second resource pattern, or the third resource pattern for signaling to the UE to measure the channel state conditions.

33. A non-transitory computer-readable medium storing computer executable code for wireless communication, comprising code for:
  receiving, by a user equipment (UE), signaling of a first resource pattern, a second resource pattern, and a third resource pattern from a serving cell, the first resource pattern identifying resources for a channel estimation on which a first transmission point located within the serving cell transmits reference signals and the second resource pattern identifying resources for an interference estimation on which a second transmission point located within the serving cell transmits the reference signals and on which the first transmission point does not transmit the reference signals, wherein the second resource pattern is a muted resource pattern that collides with a data transmission from the first transmission point to the UE, and wherein the first and second resource patterns comprise channel state information reference signal (CSI-RS) patterns, respectively;
  performing channel estimation based at least in part on the first resource pattern, and interference estimation for one or more signals from outside one or more transmission points based at least in part on the second resource pattern and the third resource pattern;
  generating a channel state condition report based on the interference estimation and the channel estimation; and
  transmitting the channel state condition report to the one or more transmission points.

34. The non-transitory computer-readable medium of claim 33, wherein the third resource pattern corresponds to one or more common reference signal (CRS) patterns corresponding to the one or more transmission points.

35. The non-transitory computer-readable medium of claim 33, further comprising code for measuring interference on a muted CSI-RS pattern of the first and second resource patterns where at least one of the one or more transmission points are not transmitting on the muted CSI-RS pattern, and wherein a non-muted CSI-RS pattern of the first and second resources patterns is filtered to remove or minimize the presence of one or more pilot signals.

36. An apparatus for wireless communication, comprising:
  a memory; and
  at least one processor coupled to the memory, the at least one processor configured to:
    signal to a user equipment (UE), from a serving cell, to measure channel state conditions based on a first resource pattern, a second resource pattern, and a third resource pattern, the first resource pattern identifying resources for a channel estimation on which a first transmission point located within the serving cell transmits reference signals and the second resource pattern identifying resources for an interference estimation on which a second transmission point located within the serving cell transmits the reference signals and on which the first transmission point does not transmit the reference signals, wherein
    the first resource pattern identifies the resources for the channel estimation for one or more signals from one or more coordinating transmission points,
    the second resource pattern is a muted resource pattern that collides with a data transmission from the first transmission point to the UE, and
    the third resource pattern identifies resources for an interference estimation for one or more signals from outside the one or more coordinating transmission points;
    receive a channel state condition report from the UE based, at least in part, on measurements obtained using the first resource pattern and second resource pattern; and
    schedule one or more resources for use by the UE based on the received channel state condition report.

37. The apparatus of claim 36, wherein the third resource pattern corresponds to one or more common reference signal (CRS) patterns of the one or more coordinating transmission points.

38. The apparatus of claim 36, wherein the at least one processor is further configured to signal one or more of identifiers (IDs) corresponding to the one or more coordinating transmission points.

39. The apparatus of claim 38, wherein the at least one processor is further configured to coordinate transmissions from the at least one of the one or more coordinating transmission points such that interference observed by the UE on the second resource pattern from the at least one of the one or more transmission points corresponds to expected transmissions by the one or more transmission points during transmissions to the UE.

40. The apparatus of claim 36, wherein the channel conditions include channel and interference estimation information.

41. The apparatus of claim 40, wherein the interference estimation is based, at least in part, on the first resource pattern resources as filtered to remove or minimize the presence of one or more pilot signals.

42. The apparatus of claim 36, wherein the first resource pattern is a first channel state information reference signal (CSI-RS) pattern, and wherein the second resource pattern is a second CSI-RS pattern.

43. The apparatus of claim 36, wherein the at least one processor is further configured to:
semi-statically configuring at least one of the first resource pattern, the second resource pattern, or the third resource pattern for signaling to the UE to measure the channel state conditions.

44. An apparatus for wireless communications, comprising:
a memory; and
at least one processor coupled to the memory, the at least one processor configured to:
receive signaling of a first resource pattern, a second resource pattern, and a third resource pattern from a serving cell, the first resource pattern identifying resources for a channel estimation on which a first transmission point located within the serving cell transmits reference signals and the second resource pattern identifying resources for an interference estimation on which a second transmission point located within the serving cell transmits the reference signals and on which the first transmission point does not transmit the reference signals, wherein the second resource pattern is a muted resource pattern that collides with a data transmission from the first transmission point to the UE, and wherein the first and second resource patterns comprise channel state information reference signal (CSI-RS) patterns, respectively;
perform channel estimation based at least in part on the first resource pattern, and interference estimation for one or more signals from outside one or more transmission points based at least in part on the second resource pattern and the third resource pattern;
generate a channel state condition report based on the interference estimation and the channel estimation; and
transmit the channel state condition report to the one or more transmission points.

45. The apparatus of claim 44, wherein the third resource pattern corresponds to one or more common reference signal (CRS) patterns corresponding to the one or more transmission points.

46. The apparatus of claim 44, wherein the at least one processor is further configured to:
measure interference on a muted CSI-RS pattern of the first and second resource patterns where at least one of the one or more transmission points are not transmitting on the muted CSI-RS pattern, and wherein a non-muted CSI-RS pattern of the first and second resources patterns is filtered to remove or minimize the presence of one or more pilot signals.

* * * * *